(12) United States Patent
Meijer et al.

(10) Patent No.: US 8,060,868 B2
(45) Date of Patent: Nov. 15, 2011

(54) FULLY CAPTURING OUTER VARIABLES AS DATA OBJECTS

(75) Inventors: Henricus Johannes Maria Meijer, Mercer Island, WA (US); Anders Hejlsberg, Seattle, WA (US); Mads Torgersen, Issaquah, WA (US); Peter A. Hallam, Seattle, WA (US); Matthew J. Warren, Redmond, WA (US); Dinesh C. Kulkarni, Sammamish, WA (US); Clemens Alden Szyperski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1148 days.

(21) Appl. No.: 11/766,514

(22) Filed: Jun. 21, 2007

(65) Prior Publication Data

US 2008/0320440 A1     Dec. 25, 2008

(51) Int. Cl.
*G06F 9/45*     (2006.01)
*G06F 9/44*     (2006.01)

(52) U.S. Cl. ......... 717/141; 717/140; 717/114; 717/116
(58) Field of Classification Search .................. 717/141, 717/140, 114, 116
See application file for complete search history.

(56) References Cited

U.S. PATENT DOCUMENTS

| | | | |
|---|---|---|---|
| 5,193,171 A | 3/1993 | Shinmura | |
| 5,500,881 A * | 3/1996 | Levin et al. .................. | 717/141 |
| 5,504,885 A | 4/1996 | Alashqur | |
| 5,615,362 A | 3/1997 | Jensen | |
| 5,664,180 A | 9/1997 | Halpert | |
| 5,748,961 A | 5/1998 | Hanna et al. | |
| 5,748,966 A | 5/1998 | Sato | |
| 5,761,493 A | 6/1998 | Blakeley | |
| 5,857,180 A | 1/1999 | Hallmark | |
| 5,897,622 A | 4/1999 | Blinn | |
| 5,907,846 A | 5/1999 | Berner | |
| 5,937,402 A | 8/1999 | Pandit | |
| 5,937,409 A | 8/1999 | Wetherbee | |
| 6,016,497 A | 1/2000 | Suver | |
| 6,029,002 A | 2/2000 | Afifi et al. | |
| 6,101,502 A | 8/2000 | Heubner | |
| 6,134,540 A | 10/2000 | Carey | |
| 6,148,296 A | 11/2000 | Tabbara | |
| 6,163,776 A | 12/2000 | Periwal | |
| 6,243,709 B1 | 6/2001 | Tung | |
| 6,339,775 B1 | 1/2002 | Zamanian | |
| 6,378,126 B2 | 4/2002 | Tang | |
| 6,425,119 B1 | 7/2002 | Jones et al. | |
| 6,442,515 B1 | 8/2002 | Varma et al. | |

(Continued)

OTHER PUBLICATIONS

Antoniol, et al. "Tracing Object-Oriented Code into Functional Requirements", 2000, IEEE, p. 1-8.*

(Continued)

*Primary Examiner* — Wei Zhen
*Assistant Examiner* — Qamrun Nahar
(74) *Attorney, Agent, or Firm* — Workman Nydegger

(57) ABSTRACT

Providing for read/write access to captured free variables expressed as environment data objects is disclosed herein. By way of example, free variables can be rewritten as a field of a private class, and accessed via an instance of the private class captured within the environment data object. In such a manner, no need of a placeholder or proxy function is required to access the free variable. Consequently, the subject innovation provides a simplified method for capturing free variables within expression trees and providing read/write access to such variables.

15 Claims, 15 Drawing Sheets

U.S. PATENT DOCUMENTS

| | | |
|---|---|---|
| 6,470,354 B1 | 10/2002 | Aldridge |
| 6,567,819 B1 | 5/2003 | Cheng |
| 6,574,673 B1 | 6/2003 | Hari |
| 6,615,323 B1 | 9/2003 | Petersen |
| 6,625,620 B1 | 9/2003 | Tagg |
| 6,690,981 B1 | 2/2004 | Kawachi |
| 6,857,118 B2 | 2/2005 | Karr |
| 6,968,355 B2 | 11/2005 | Baldwin |
| 6,971,085 B1 | 11/2005 | Alcom |
| 6,985,912 B2 | 1/2006 | Mullins |
| 6,993,529 B1 | 1/2006 | Basko |
| 7,043,720 B2 | 5/2006 | Kuzmin |
| 7,093,231 B2 | 8/2006 | Nuss |
| 7,096,231 B2 | 8/2006 | Rajak |
| 7,103,590 B1 | 9/2006 | Murthy |
| 7,137,100 B2 | 11/2006 | Iborra |
| 7,185,016 B1 | 2/2007 | Rasmussen |
| 7,197,747 B2 | 3/2007 | Ishizaki |
| 7,284,242 B2 | 10/2007 | Vion-Dury |
| 7,289,997 B1 | 10/2007 | Kita |
| 7,290,018 B2 | 10/2007 | Muecklich |
| 7,310,638 B1 | 12/2007 | Blair |
| 2002/0194155 A1 | 12/2002 | Aldridge |
| 2003/0061244 A1 | 3/2003 | Hirohata |
| 2003/0208505 A1 | 11/2003 | Mullins |
| 2004/0098384 A1 | 5/2004 | Min |
| 2004/0158549 A1 | 8/2004 | Matena |
| 2004/0194057 A1 | 9/2004 | Schulte |
| 2004/0210828 A1 | 10/2004 | Langer |
| 2004/0230584 A1 | 11/2004 | Nouri |
| 2004/0243921 A1 | 12/2004 | Carr |
| 2004/0260691 A1 | 12/2004 | Desai |
| 2004/0268328 A1 | 12/2004 | Plesko |
| 2005/0027681 A1 | 2/2005 | Bernstein |
| 2005/0055336 A1 | 3/2005 | Hui |
| 2005/0138073 A1 | 6/2005 | Zhou |
| 2005/0166183 A1 | 7/2005 | Brown, Jr. et al. |
| 2006/0136358 A1 | 6/2006 | Sonkin |
| 2006/0179068 A1 | 8/2006 | Warner |
| 2006/0195476 A1 | 8/2006 | Nori |
| 2006/0200438 A1 | 9/2006 | Schloming |
| 2006/0294059 A1 | 12/2006 | Chamberlain |
| 2007/0044066 A1 | 2/2007 | Meijer et al. |
| 2007/0044083 A1 | 2/2007 | Meijer et al. |
| 2007/0067716 A1 | 3/2007 | Jung |

OTHER PUBLICATIONS

Larry O'Brien, "One Language to Bind Them All", SD Times Mar. 1, 2006, 5 pages, http://www.sdtimes.com/article/special-20060301-01.html.

Guillermo J. Rozas, "Taming the Y operator", Proceedings of the 1992 ACM Conference on Lisp and Functional Programming, Jun. 1992, 9 pages, http://delivery.acm.org/10.1145/150000/141545/p226-rozas.pdf?key1=141545&key2=7539686711&coll=GUIDE&dl=GUIDE&CFID=20252086&CFTOKEN=80455693.

Lars Reder Clausen, "Optimizations in Distributed Run-Time Compilation", 2004, 167 pages, http://loome.cs.uiuc.edu/pubs/lars-thesis.pdf.

Abelson, et al., Structure and Interpretation of Computer Programs. The Rules of Evaluation [online], Cambridge, MA: The MIT Press, 1996, retrieved on Jan. 31, 2007, 3 pages. http://mitpress.mit.edu/sicp/full-text/book/book-Z-H-4.html#%_toc_%_sec_3.2.1.

Barendregt, The Impact of the Lambda Calculus and Computer Science, Feb. 28, 1997, The Bulletin of Symbolic Logic [online], Jun. 1997 [retrieved on Jan. 30, 2007] http://eiteseerx.ist.psu.edu/viewdoc/summary?doi=10.1.1.25.9348 Last Accessed Feb. 20, 2009, 32 pages.

Demuth, et al. OCL as a Specification Language for Business Rules in Database Applications. LNC 2185, pp. 104-117,2001, Springer Verlag Berlin, Heidelberg 2001,16 pages.

Bonifati et al. "Pushing Reactive Services to XML Repositories Using Active Rules," WWW10, May 1-5, 2001, Hong Kong. ACM 1-58113-348-0/01/0005. http://portal.acm.org/citation.cfm?id=372168. Last accessed Feb. 20, 2009, 9 pages.

BURTON. .Net Common Language Runtime Unleashed, Chapter 14: Delegates and Events, Apr. 4, 2002, 3 pages, SAMS.

C#: Overview of C# 3.0, Draft 2, Jul. 2005, 18 pages.

Functional Programming. J. Webster (ed). Wiley Encyclopedia of Electrical and Electronics Engineering, 1999. John Wiley and Sons, Inc., 13 pages.

Gupta, et al. Semantic-Based Filtering: Logic Programming Killer App. Retrieved Jul. 30, 2007,15 pages.

Orenstein, et al. Assessing a Relational Database through an Object Oriented Interface (extended abstract). Proceedings of the 21st VLDB Conference, Zurich, Switzerland 1995,4 pages.

Jones, et al. A Pattern Language Implementation, 2004. Retrieved Jul. 30, 2007, 36 pages.

Sundaresan et al. "Algorithms and Programming Models for Efficient Representation of XML for Internet Applications," ACM 2001, May 1, 2001, 10 pages, Hong Kong.

Heil, et al. "Concurrent garbage collection using hardware-assisted profiling," Proceeding of the 2nd international symposium on Memory Mangement. http://citeseerxjst.psu.edu/viewdoc/summary?doi=1 0.1.1.29.9867. last accessed Feb. 20, 2009, 14 pages.

Scheer, et al. Accelerating Your Object-Oriented Development. An Objectivity, Inc. White Paper. Lockheed-Martin Mission Systems 1999, 18 pages. www.objectivity.com.

Urban, et al. An Object Oriented Query Object Interface to Relational Databases, IEEE, 1994, 8 pages.

Vieira et al. "XVerter: Querying XMI Data with OR-DBMS," AMD 2003, Nov. 7, 2003, 8 pages, New Orleans, Louisiana. http://portal.acm.org/citation.cfrn?id=956699.956707&type=series. last accessed Feb. 20, 2009, 8 pages.

Eshelman. Standard Interface: An Object to Relational Mapping Interface to Relational Databases. TCI 2003/2004. AT&T Corp. http://www.tcl.tklcommunity/tcl2004/Tcl2003papers/eshelman/SI.htm. last accessed Nov. 13, 2007, 32 pages.

Schrettner et al., Parallel Execution of Object Functional Queries. Proceedings of the Fourth Symposium on Programming Languages and Software Tools, Hungary, Jun. 9-10, 1995, 9 Pages.

Appel, Andrew W. "A Standard ML Compiler." IN Functional Programming Languages and Computer Architecture. 1987. Springer-Verlag pp. 301-324 Retrieved from http://citeseerx.ist.psu.edu/viewdoc/download;jsessionid= 52E0B629682496E5 BAD2886354 FCBDB6? doi=1031.1.35.571&rep=rep1&type=pdf on Apr. 21, 2009.

Jarvi, Jaakko, Gary Powell and Andrew Lumsdaine. "The Lambda Library: unnamed functions in C++" Software—Practice and Experience, 2003. vol. 33, pp. 259-291. Retrieved from http://portal.acm.org/citation.cfm?id=779144 on Sep. 9, 2009.

McNamara, Brian and Yannis Smaragdakis. "Functional Programming in C++" Proceedings of the fifth ACM SIGPLAN international conference on Functional programming, 2000. pp. 118-129. Retrieved from http://portal.acm.org/citation.cfm?id=351251 on Sep. 9, 2009.

Willcock, Jeremiah, Jaakko Jarvi, Doug Gregor, Bjarne Stroustrup, and Andrew Lumsdaine. "Lambda expressions and closures for C++." Feb. 26, 2006, ISO WG21 The C++ Standards Committee Dcoument No. N1968=06-0038. pp. 1-14. Retrieved from http://www.open-std.org/JTC1/SC22/WG21/docs/papers/2006/n1968.pdf on Sep. 8, 2009.

SGI. "find-if" Jun. 8, 2000 Release 3.3 Standard Template Library, SGI.

Gregor, Douglas, Jaakko Jarvi, Mayuresh Kulkarni, Andrew Lumsdaine, David Musser, and Sibylle Schupp. "Generic Programming and High-Performance Libraries." Jun. 2005, International Journal of Parallel programming, vol. 33, No. 2, pp. 1-21. Retrieved from http://faculty.cs.tamu.edu/jarvi/publications/Keyword/GENERIC-PROGRAMMING.html on Sep. 10, 2009.

Lischner, Ray. "C++ In a Nutshell, 1st Edition" Sections 3.1 "L-values and R-values" and 5.3 "Function Overloading."

International Search Report dated Nov. 14, 2007 for PCT Application Serial No. PCT/US06/25575, 2 Pages.

Jarvi, Jaakko, Gary Powell. "Chapter 5, boost.Lambda", boost.org. Boost Version 1.32.0, copyright Nov. 19, 2004. pp. 1-14. Retrieved from http://www.boost.org/doc/libs/1_32_0 on Sep. 9, 2009.

Gregor, Douglas. "Chapter 4. Boost.Function", boost.org. Boost Version 1.32.0, copyright Nov. 14, 2004. pp. 1-14. Retrieved from http://www.boost.org/doc/libs/1_32_0 on Sep. 9, 2009.
Ashish Gupta, "Aggregate-Query Processing in Data Warehousing Environments" 1995, Proceedings of the 21st VLDB Conference.
Kevin Kline, "SQL in a Nutshell", 2003, O'Reily & Associates.
"mysql_fetch_rom", Jun. 2001, PHP Group.
"SQL Tutorial", Jun. 2003.
Satir, Gregory and Doug Brown, "C++: The Core Language", 1995, O'Reilly & Associates, Inc. First Edition. pp. 16-17.
Meijer et al., "Unifiying Tables, Objects and Documents", 2003, Proceeding of Declarative Programming in the Context of OO Languages (DP-COOL 2003).
U.S. Appl. No. 11/193,566, mail date Dec. 29, 2008, Office Action.
U.S. Appl. No. 11/193,566, mail date Jul. 17, 2009, Office Action.
U.S. Appl. No. 11/193,565, mail date Dec. 12, 2008, Office Action.
U.S. Appl. No. 11/193,565, mail date May 4, 2009, Office Action.
U.S. Appl. No. 11/193,565, mail date Sep. 28, 2009, Office Action.
U.S. Appl. No. 11/193,565, mail date Mar. 28, 2011, Office Action.
U.S. Appl. No. 11/193,690, mail date Jan. 14, 2008, Office Action.
U.S. Appl. No. 11/193,690, mail date Sep. 12, 2008, Office Action.
U.S. Appl. No. 11/193,690, mail date Mar. 18, 2009, Office Action.
U.S. Appl. No. 11/193,690, mail date Sep. 17, 2009, Notice of Allowance.
U.S. Appl. No. 11/193,574, mail date Nov. 1, 2007, Office Action.
U.S. Appl. No. 11/193,574, mail date May 15, 2008, Office Action.
U.S. Appl. No. 11/193,574, mail date Dec. 18, 2008, Office Action.
U.S. Appl. No. 11/193,574, mail date May 29, 2009, Office Action.
U.S. Appl. No. 11/193,573, mail date Aug. 2, 2007, Office Action.
U.S. Appl. No. 11/193,573, mail date Nov. 29, 2007, Office Action.
U.S. Appl. No. 11/193,573, mail date Apr. 29, 2008, Office Action.
U.S. Appl. No. 11/193,573, mail date Oct. 31, 2008, Office Action.
U.S. Appl. No. 11/193,573, mail date Jun. 8, 2009, Office Action.
U.S. Appl. No. 11/193,721, mail date Dec. 29, 2008, Office Action.
U.S. Appl. No. 11/193,721, mail date Jun. 9, 2009, Office Action.
U.S. Appl. No. 11/193,573, mail date Oct. 23, 2009, Office Action.
U.S. Appl. No. 11/193,566, mail date Dec. 14, 2009, Office Action.
U.S. Appl. No. 11/193,574, mail date Dec. 29, 2009, Notice of Allowance.
U.S. Appl. No. 11/193,565, mail date Apr. 12, 2010, Office Action.
U.S. Appl. No. 11/193,566, mail date May 26, 2010, Office Action.
U.S. Appl. No. 11/193,787, mail date Jul. 7, 2010, Office Action.
U.S. Appl. No. 11/193,565, mail date Oct. 13, 2010, Office Action.
U.S. Appl. No. 11/193,787, mail date Jan. 4, 2011, Office Action.
Wadler P et al., "How to Make ad-hoc Polymorphism less ad-hoc" Conference Sixteen Annual ACM Symposium on Principles of Programming Languages. Austin, Tx, USA Jan. 11, 1989-Jan. 13, 1989 pp. 60-76, Conference Record of the Sixteenth Annual ACM Symposium on Principles of Programming Languages ACM New York, NY, USA.
Smith G.S: "Principle Type Schemes for Functional Programs with Overloading and Subtyping" Tapsoft '93, 4th International Joint Conference on the Theory and Practice of Software Development. Orsay, France, vol. 23, No. 2-3, Apr. 13, 1993-Apr. 17, 1993, pp. 197-226, Science of Computer Programming, Netherlands.

* cited by examiner

FULLY CAPTURING OUTER VARIABLES AS DATA OBJECTS

CROSS-REFERENCE TO RELATED APPLICATIONS

This application is related to U.S. patent application Ser. No. 11/193,565, filed Jul. 29, 2005, entitled LAMBDA EXPRESSIONS IN IMPERATIVE AND/OR OBJECT ORIENTED COMPUTER-PROGRAMMING LANGUAGES, as well as U.S. patent application Ser. No. 11/193,721, filed Jul. 29, 2005, which issued as U.S. Pat. No. 7,992,140 on Aug. 2, 2011, entitled COMPILER SUPPORTING PROGRAMS AS DATA OBJECTS, and U.S. patent application Ser. No. 11/193,556, filed Jul. 29, 2005, entitled FREE/OUTER VARIABLE CAPTURE. The entireties of these applications are incorporated herein by reference.

BACKGROUND

Programming languages originated within the concept of sequential instructions delivered to a machine for execution. These sequential instructions were typically rooted in logical expressions and functions that could be quickly turned into low-level machine code. For example, machine code typically utilized some form of assembly language and/or binary machine language executed by processing hardware. Such languages were efficient for instructing a computer to sequential logic, but were difficult for programmers to utilize in representing real-world functions to be performed by an executing machine.

In order to facilitate comprehension and development of sophisticated logic viewed from a functional perspective, languages were introduced that provided various layers of abstraction. Accordingly, programmers could write programs based on logical operations associated with function, utilizing a relatively higher level source language. Such source language could then be converted to machine language by way of a compiler or interpreting device. Further advances in programming have created additional advances in programming logic to facilitate further abstraction and abstraction with respect to various functional perspectives. However, such advances can often be limited by contemporaneously available processing capabilities.

Compilers and/or interpreters bear the burden of translating high-level logic into executable machine code. In general, a compiler and/or interpreter is a component that receives a program specified in a source programming language (e.g., C, C#, Visual Basic, Java . . . ) and converts the logic provided thereby to machine language that is executable by a hardware device. However, the conversion need not be done verbatim. In fact, conventional compilers and/or interpreters analyze the source code and generate very efficient code. For example, programmers write code that sets forth a logical flow of operations that is intuitive and easy for humans to understand, representing a function of a program or process from a perspective external to a device for instance, but that is often inefficient for a computer to execute. Compilers and/or interpreters can identify inefficiencies and improve program performance at the hardware level by eliminating unnecessary operations and/or rearranging the execution of instructions while still achieving the intended results. In this manner, programmers can create robust and efficient software programs.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject matter disclosed and claimed herein, in various aspects thereof, provides for simplifying capture of one or more free variables in one or more expression trees by restructuring the free variable(s) as fields of a private environment object class. In such a manner, free variables can be accessed via the environment object, such as an expression tree, without need of a placeholder or proxy function within the expression tree. Consequently, the subject innovation provides a simplified method for capturing free variables that can be applied to explicit expressive constructs, such as expression trees, as well as non-expressive constructs such as lambda expressions.

In accordance with additional aspects of the claimed subject matter, fully capturing and distributing outer/free variables as read/write data objects is provided. Components of a system can include an assignment component that can capture a free variable in a representation of a closure (e.g., a function, expression, expression tree, and the like), and a code restructuring component that can rewrite the free variable as an environment object and create an expressive representation of the closure. The expressive representation can be passed to other entities that can read/write to the outer variable via the environment object. In such a manner, the claimed subject matter can facilitate interaction with local variables contained within expression trees in a manner commensurate with such variables contained within lambda expressions, expression trees, or other closures.

In accord with further aspects of the claimed subject matter, run time security mechanisms are implemented in conjunction with a free/outer variable lifted to a field of private environment object class and captured within an explicit data object. Such run time security can accompany an object as it is ported among operating environments and require a security criteria be met for access to the object at run time. In such a manner, full access to an outer variable represented as a data object can be given on a conditional basis, protecting the integrity of code and/or data represented by such an object.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
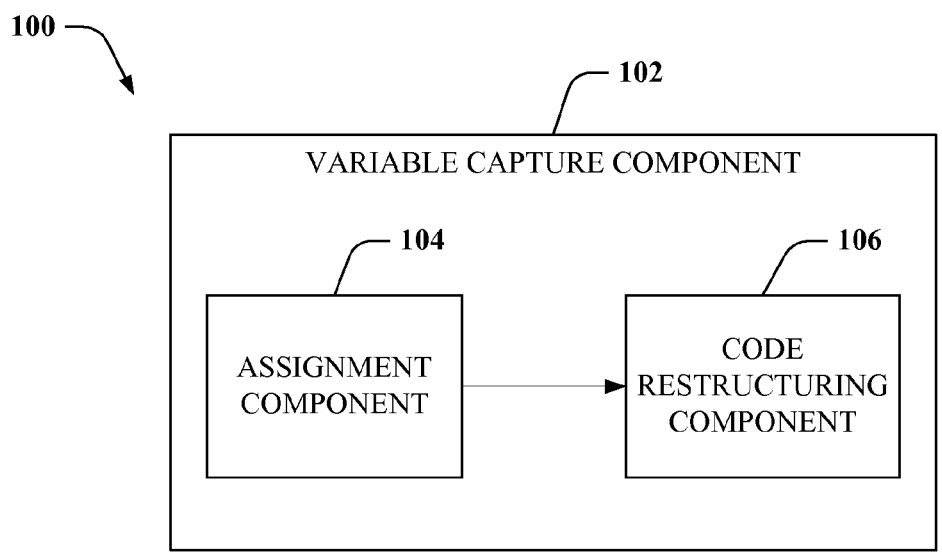
FIG. 1 depicts an example outer/free variable capture component in accord with aspects of the claimed subject matter.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components, and can be as simple as a command line or a more complex Integrated Development Environment (IDE).

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

With reference to FIG. 1, a system 100 is depicted that can fully capture outer/free variables as data objects in accord with aspects of the subject innovation. As used herein, a free or outer variable refers to a variable captured (e.g., referenced, called, etc.) in programmatic code, but neither defined by that code nor local to that code. As such, an outer variable can survive termination of a particular closure (e.g., class, method, function, expression, or the like), that captures the variable. Although such closure cannot terminate the outer variable, they can still bind and extend the life of such variable to at least the life of the closure. Stated differently, memory (e.g., hardware, virtual, and/or combination of hardware and virtual) allocated to the outer/free variable is not erased upon termination of a closure that captures the variable, but erasure can be prevented by the existence of such a capturing class.

As an example, a variable captured by a closure (e.g., a function, expression tree, lambda expression, or like programmatic structure that can capture a variable) but not listed in an argument list of that closure is a free/outer variable. More succinctly, a free or outer variable can be any variable or parameter that is defined and/or declared outside of a programmatic construct. Consequently, status as a free/outer variable is dependent upon a relation to the code capturing the variable.

Variable capture component 102 can generate programmatic code that captures (e.g., binds) a free variable within a closure, lifts the variable out of a local environment and rewrites it as a field of an environment object, and then creates an explicit representation of the closure/variable. An assignment component 104 can capture the free variable in a representation of a closure. For example, a method, or the like, can be created that defines the variable (e.g., as a primitive type) local to the method. In addition, the method can incorporate a function, lambda expression, expression tree, or like construct that captures the variable. The following code can indicate a free variable captured in a closure (e.g., expression tree):

```
int y=1;
```

```
Expression<Function<int,int>>f=x=>x−y
```

The expression x=>x−y is a lambda expression that can be called and executed at runtime. The line 'Expression<Function<int,int>>f=x=>x−y' defines 'f' as a variable of type Expression<Function<int,int>> and assigns to 'f' an expression tree that describes a lambda function 'x=>x−y'. This assignment creates the lambda expression that yields a function of 'x'. The function, when applied or evaluated, computes the result of subtracting local variable 'y' from parameter 'x'.

An expression tree is a data object that can represent programmatic code as data. Referencing or calling a variable that represents such data object can call, execute, etc., programmatic code reserved in a portion of memory assigned to the variable (e.g., the variable 'f' in this case). Consequently, by referencing the local variable in a lambda expression, assignment component 104 can capture the local variable. For example, assignment component 104 can generate the following code that captures the variable y in a representation of a closure:

```
int y=1;
```

```
<Function<int,int>>f=x=>x−y
```

The variable y is now defined as an integer and captured as part of the lambda expression x=>x−y.

Composition component 106 can rewrite a captured free variable as an environment object and create an explicit representation (e.g., expression tree) of a closure capturing the object. Referring back to the expression tree indicated above, composition component 106 can lift the variable y into a field of class Display. In addition, composition component 106 can create an instance of the variable y as a member of the Display class generated by assignment component 104, and include the instance variable within an expression tree. For example, the following code can be generated by composition component 106:

```
class Display {
    int y;
}
Display d = new Display ( );
...
    d.y = 1;
    Expression<Function<int,int>> f = x => x − d.y
```

The expression tree no longer calls the free variable 'y'; 'y' has been lifted out of the lambda expression and rewritten as an environment object of class Display. Consequently, an instance of the variable d is created, 'd.y', effectively allowing y to be accessed outside of an original method, function, etc., defining 'y'. More specifically, access to the local variable 'y' changes into access of the instance variable 'd.y'. Consequently, 'd.y' can be forwarded as part of the expression tree assigned to f and read and/or modified. Therefore, by creating an instance of 'y' within an environment class (e.g., Display class), and rewriting an instance of the environment class within the expression tree, 'y' can be effectively transformed from a local variable to a read/write environment object.

The following example can be illustrative of the function provided by system 100. Assume the following programmatic construct is created within and a method F( ) inside a class C:

```
class C {
    void F( ) {
        int y = 1;
        Expression<Function<int,int>> g = x => x + y;
        int z = y + 2;
        y = 5;
    }
}
```

System 100 can rewrite this construct so as to lift the free variable 'y', defined local to the method F( ), as a field of an environment object of class C. An expressive representation (e.g., the expression tree) can then capture a reference to 'y' as an instance of the environment object. Specifically, the construct can appear as follows:

```
class C {
    class Display {
        int y;
    }
    Display d = new Display ( );
    void F( ) {
        d.y = 1;
        Expression<Function<int,int>> g = x => x + d.y;
        int z = d.y + 2;
        d.y = 5;
    }
}
```

As depicted, the local variable 'y' is effectively lifted from 'the stack' into 'the heap', by creating an explicit environment (e.g., Display class in this instance) that contains the variable 'y'. As structured above, the local variable 'd' will not be assigned to after its initial assignment, in effect rendering it read only. Consequently, d (or, e.g., an instance of 'd' such as 'd.y') can be captured in the expression tree simply by substituting an object referenced by 'd' (e.g., a data object, data value, string, etc., stored in memory allocated to variable d) rather than the variable d itself. In other words, captured local variables can be lifted outside of a closure (e.g., method), which can be rewritten into an explicit expression representation. Consequently, the variable capture problem is reduced to capturing instance fields rather than local variables.

Figure 2:
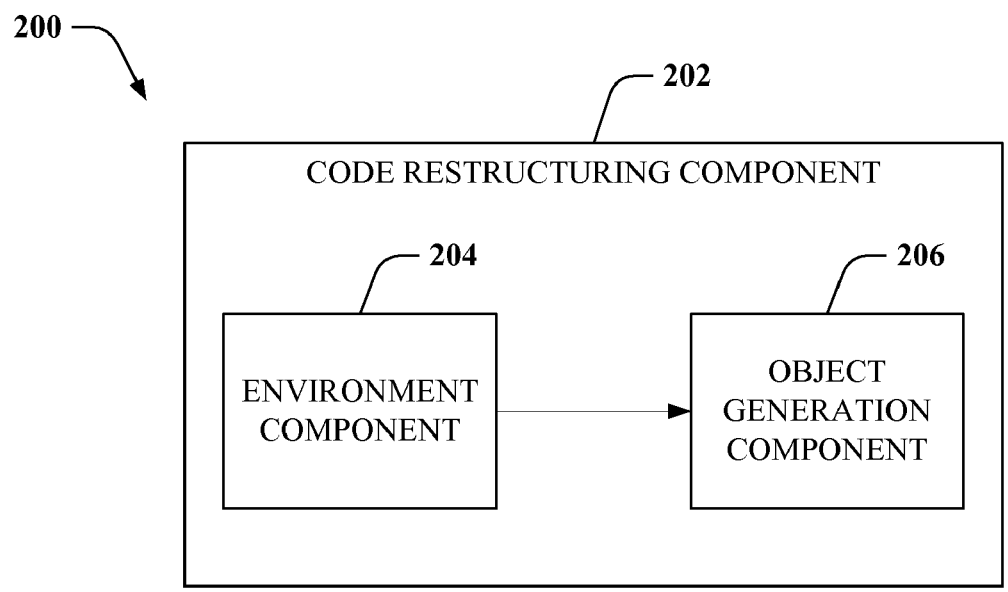
FIG. 2 illustrates an exemplary code restructuring component that can lift a free variable to an environment object.

FIG. 2 illustrates a block diagram 200 of an exemplary code restructuring component 202 that can restructure a captured free variable as an environment object and recreate a closure as an explicit expressive representation. An example of an explicit expressive representation in accord with the subject innovation can include a data object, an expression tree, or the like. Code restructuring component 202 can comprise at least an environment component 204 and an object generation component 206. Environment component 204 can rewrite a captured outer variable (e.g., within code created by assignment component 104, for instance) and rewrite it as part of a separate programmatic construct (e.g., a method or object class, such as the Display class, illustrated at FIG. 1, supra). In addition, the rewritten construct can be structured so as to be of a different programmatic level than a class, method, etc. originally defining the local variable. For instance, a local variable defined within a method F ( ) of a class C, can be lifted to a level commensurate with the method F ( ) within class C (e.g., as indicated at FIG. 1, supra). Additionally, environment component 204 can rewrite programmatic code so as to shift a construct, including a captured outer variable defined therein, to a lower or higher structured level within such code, as required. Subsequently, the rewritten construct can be forwarded to object generation component 206 for expressive representation, if appropriate.

Object generation component can rewrite a closure or related programmatic code into an expressive data object. As an example, the following function:

Function<int,int>f=x=>x+y assigning the lambda expression x=>x+y to the variable f can be rewritten as an expression tree via the following and/or like code:

Expression<Function<int,int>>f=x=>x+y

By virtue of assigning the lambda expression to a variable f of form Expression < . . . >, as discussed previously, object generation component 206 can restructure a function into an expressive representation of code. For instance, memory (not depicted) allocated to the variable f can store programmatic code representing the expression tree assigned to f, instead of a value determined by a function determined at run time.

One benefit of such an expressive representation of data as code is an ability to distribute, interact with and update such code, instead of merely capturing a contemporaneous value of data. In such a manner, code restructuring component 202 can receive a captured outer variable (e.g., within a closure), rewrite the outer variable as an environment object separate from the closure, and represent the closure as an expressive data object. Consequently, code restructuring component 202 can reduce the typical problem of capturing outer variables to capturing a field or instance thereof.

Code restructuring component 202 can provide a significant improvement over previous systems. Previous programming techniques required that captured outer variables presented within explicit expressive representations such as data objects and/or expression trees required additional explicit representation of the captured variable for access to such variable. Consequently, captured variables were including in thunks, or funclets, (e.g., a small programmatic method or procedure that acts as a placeholder or proxy for a variable that, when called or executed, can return the value of a referenced variable) in order to provide a concurrent reference to memory allocated to the variable.

The subject innovation provides an alternative mechanism wherein an explicit representation of a captured variable is provided within the explicit representation of the closure that captures it. In accord with aspects disclosed herein, a captured outer variable can be passed among operating environments (e.g., via an ad hoc network, wired or wireless TCP/IP network, the Internet, an intranet, or the like) as a true read/write data object. Explicit representation of a closure capturing such data object is sufficient to provide for read/write access to the data object, contrary to conventional wisdom. Therefore, the subject innovation provides for an advance in the field of programming by presenting a simpler mechanism for capturing an outer/free variable that can provide read/write access to such variable as a data object.

Figure 3:
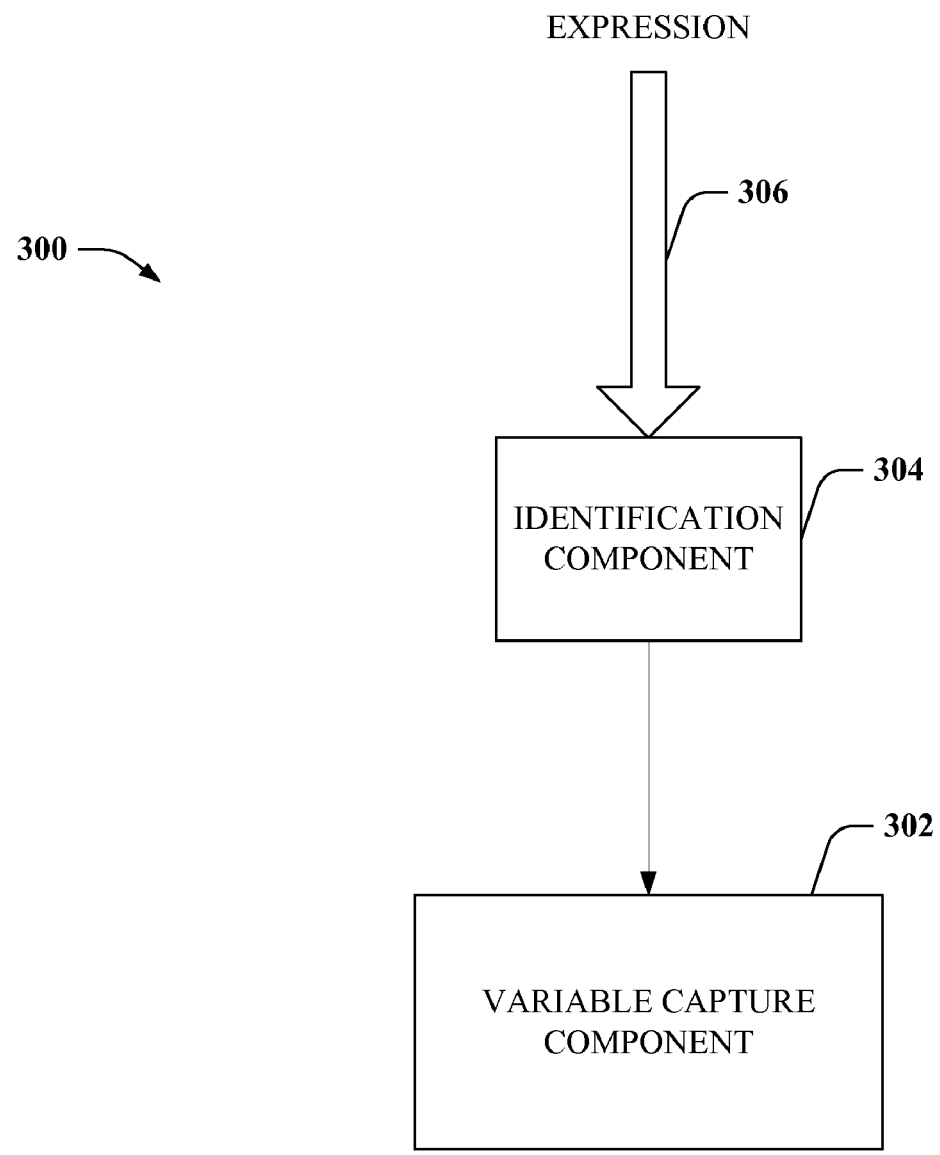
FIG. 3 illustrates a sample system for identifying and capturing free/outer variables in accord with aspects disclosed herein.

FIG. 3 illustrates a sample system 300 that can identify and capture free/outer variables in accord with aspects disclosed herein. Variable capture component 302 can capture an outer variable within a closure, rewrite the captured variable as an environment object, and create an explicit representation of the capturing closure, as described herein. In addition, system 300 can include an identification component 304 communicatively coupled with the variable capture component 302 (e.g., via a data line, copper wire, printed circuit board, an ad hoc data network, TCP/IP network, Ethernet-type network, or the like). The identification component 304 can identify a presence of free/outer variables within a programmatic expression 306, and indicate and/or provide such variables to variable capture component 302.

Identification component 304 can examine programmatic constructs, expressions (306), etc., or portions thereof in order to identify a presence of free variables within such construct or expression 306. As discussed at FIG. 1, supra, a free variable can be defined as a variable captured within a closure, such as a class, method, function, delegate, anonymous expression, or the like, not defined within such class, method, etc. Stated differently, a free or outer variable can be any variable or parameter that is defined and/or declared outside of an expression (e.g., method, class, function, anonymous expression, etc.) As a specific example, a variable captured within a closure but not included within an argument list of the closure is a free variable.

Consider the following non-limiting example of programmatic code:

int y=1;

Function<int,int>f=x=>x-y

A local variable 'y' is declared to be a primitive of type integer and having a value of 1. Furthermore, a lambda expression is represented by the portion of code 'x=>x-y'. Such lambda expression is assigned to the function, delegate, or anonymous method 'f' (e.g., triggered by the fact that 'f' is assigned to a function of type Function < . . . >) that receives an integer and returns an integer (e.g., specified by the code Function <int,int>). Specifically, the lambda expression and the assigned function receive an integer value represented by the variable parameter 'y', subtract the value of 'y' from a value of 'x', and return the result as an integer. The variable or parameter 'y' is defined and declared as a local variable outside of the lambda expression (at the line int y=1), but it is also captured by the lambda expression (e.g., included within the scope of the expression) and its assignment to the function 'f'. Consequently, 'y' is a free variable with respect to the lambda expression 'x=>x+y' and with respect to the function 'f', as it is captured by such expression and function but not defined within either. As such, variable 'y' can be identified by identification component 304 and indicated and/or provided to variable capture component 302.

Variable capture component 302 can receive identified free or outer variables from identification component 304. Variable capture component 302 can capture a free variable, for instance, by incorporating the variable within a closure. A lambda expression can be such a closure; for example:

int y=1;

x=>x+y can be sufficient to capture the free variable 'y' within the lambda expression 'x=>x=y'. Additionally, a variable can be captured by including a value of the variable (e.g., 1 in above example code) within a closure, incorporating a reference to the variable within a programmatic construct, or like mechanism. It should be appreciated that capturing a variable in a manner specified herein can affect the duration or life of such a variable. Typically, the duration of a variable is limited by the construct that defines and declares it. Upon execution and termination of such construct, variables declared therein can be deleted and space allocated within memory for that variable can be erased, freed up, de-allocated, re-allocated, etc. However, when an outer or free variable is captured by another programmatic construct, its life is extended by the lifetime of the construct capturing it.

As a result of the foregoing, variable capture component 302 can extend the life of a variable by capturing (e.g., referencing, including a value of, or the like) it within a closure. By rewriting the captured variable as an environment object, reference to the variable can be by an instance of the environment object, for example. The following code:

```
class Display {
    int y = 1
}
Display d = new Display ( );
...
d.y = 1;
Function<int,int> f = x => x + d.y;
...
``` can be an example of rewriting the local outer variable 'y' as an environment object, an referencing y within the lambda expression as an instance of such environment object. Moreover, the closure capturing the variable can be restructured as an explicit expressive entity (e.g., data object, expression tree, or the like), transforming the variable reference (e.g., instance of the environment object, see FIG. 4, infra, for a more detailed discussion) into a fully read/writeable data object. For example:

Expression<Function<int,int>>f=x=>x+d.y

Such data object can then be exported and imported from one operating environment to another via the explicit expressive entity (e.g., expression tree). In such a manner, system 300 can increase expressive power of programmatic code by identifying free variables, extending the lifetime of such variables, and transforming them into read/write data objects as described herein.

Figure 4:
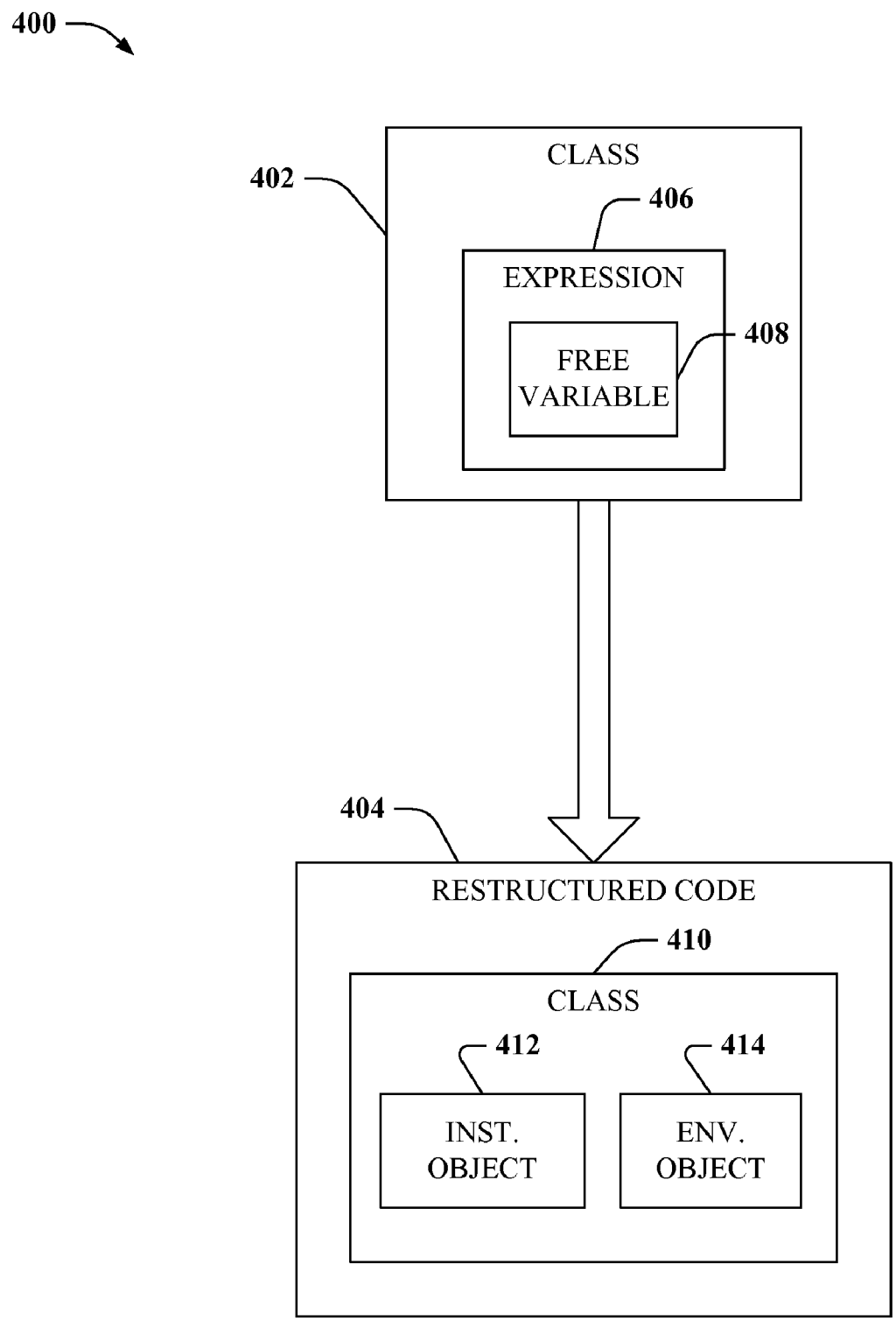
FIG. 4 depicts an example of source code rewritten as an environment object and instance thereof in accord with aspects of the subject innovation.

FIG. 4 depicts an example block diagram 400 of source code (402) rewritten as an environment object (404) and instance thereof in accord with aspects of the subject innovation. Class 402 can be a typical programmatic construct defining a class object. Such class 402 can include additional programmatic code, including variables, methods, data objects, functions, expressions, and the like, representing portions of physical and/or virtual memory allocated to storing data related to such code. For example, an expression 406 can be included within class 402. Such expression 406 can be, for example, a lambda expression assigned to a function. Furthermore, expression 406 can include a free variable 408, as defined above (e.g., see FIG. 3 for a more detailed discussion of a free variable). The following simple code can be illustrative of class 402:

```
class C {
    void F( ) {
        Int y = 1;
        Function<int,int> f = x => x + y;
        ...
    }
}
```

The foregoing programmatic code is very simple, but can contain the elements (406, 408) depicted in class 402. Foremost, the code contains a defined class (402), class C. In addition, included within class C (402) is a lambda expression assigned to a function, delegate, anonymous method, or the like, 'f'. Such an assignment can be illustrative of expression 406, defined within class C (402). In addition, the foregoing code contains a free variable (406) 'y', defined outside of the lambda expression and captured within it.

Class 402 can be rewritten in accord with the subject innovation so as to extend the life of a free variable(s) contained therein, and turn such a free variable into a mobile read/write data object. For example, class 402 can be created as a restructured construct 404 containing, for example, different classes (410), expressions, objects (414), instances of variables (412), and the like. Furthermore, the restructured classes, expressions, objects, etc., associated with restructured construct 404 can be of different hierarchical levels with respect to counterparts of class 402. For example, a variable (408) captured within a method (406) of class 402 can be redefined external a correlated method or class (410) of restructured code 404.

Restructured code 404 can include at least one or more classes 410 in addition to or in lieu of class 402, one or more instance objects 412, and one or more environment objects 414. It should be appreciated that other programmatic constructs, including expressions, methods, functions, variables, data objects, expression trees, lambda expressions and virtually any suitable form of programmatic code, at varying hierarchical levels, can be included as part of restructured code 404. It should also be appreciated that a device, thread of execution, or combination thereof can facilitate restructuring class 402 into restructured code 404 (e.g., code restructuring component 106, 202), such as a compiler or similar mechanism (e.g., see FIG. 13 for a more detailed description of a compiler).

To continue the previous example programmatic representation of class 402, described above, the following can represent a suitable embodiment of restructured code 404 transformed from class 402:

```
class C {
    class Display {
        int y = 1;
    }
    Display d = new Display ( );
    void F( ) {
        d.y = 1;
        Function<int,int> f = x => x + d.y;
        ...
    }
}
```

The above example of restructured code 404 includes a class 410 (e.g., class C), an instanced object 412 (e.g., d.y) of class C, and an environment object 414 (e.g., class Display) of class C. The foregoing is but a single example of restructured code 404 in accord with aspects of the subject innovation. As an additional example, the delegate 'f' can be structured as an explicit expressive representation (e.g., a data object) as follows:

```
class C {
class Display {
    int y = 1;
}
Display d = new Display ( );
void F( ) {
    d.y = 1;
    Expression<Function<int,int>> f = x => x + d.y;
    ...
}
```

In such a manner, restructured code 404 can lift the free variable 'y' out of the stack into an environment object of class Display, create an instance of the environment object (e.g., d.y) captured within a closure (e.g., lambda expression), and rewrite the closure as an explicit expressive representation, in accord with aspects of the claimed subject matter. It is to be appreciated that the foregoing code is a non-limiting example of a first programmatic construct (402) rewritten in a different form to accomplish innovative aspects disclosed herein. Other examples, known in the art or made known to one of skill in the art by way of the context provided herein are incorporated into the subject disclosure.

Figure 5:
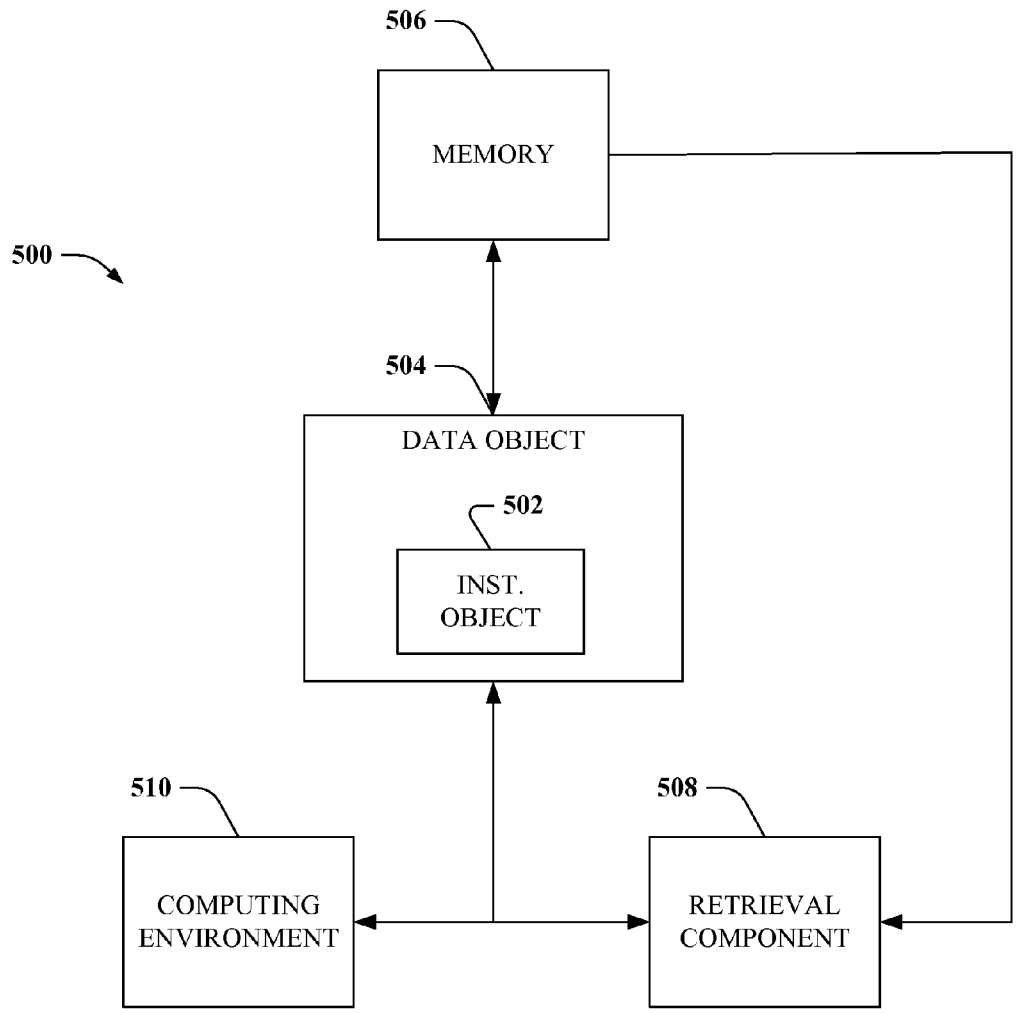
FIG. 5 depicts a sample system that retrieves a value of a free variable captured by an expression tree.

FIG. 5 depicts a sample system 500 that can retrieve a value of a free variable (502) captured by an expression tree (504) from memory 506. System 500 can include a retrieval component 508 that can interact with at least a portion of memory 506 allocated to an instanced variable (e.g., d.y, described at FIG. 4, supra). Furthermore, such instanced variable can be captured within an expressive representation of a closure, such as a data object 504 (e.g., an expression tree).

An expression tree, or other data object 504, is programmatic code that can be represented by data. As data, such code can be included within functions, expressions, methods, etc., called by a program, or the like. When executed, the programmatic code that comprises the expression tree can also be executed, or viewed, can receive arguments (e.g., variables, values of variables, references to variable values, etc.), provide arguments, or the like.

Programmatic code associated with data object 504 can be stored in memory 506 (e.g., hard disk, FLASH memory, CD, floppy disk, virtual memory, or portion thereof, or any suitable data storage entity) allocated to the data object 504. Furthermore, a computing environment 510 can be provided data object 504 (e.g., as part of a larger program, as part of an executing process between two computing environments, transmitted via a data line, data network, wireless network or the like, loaded onto computing environment 510 from memory such as removable hardware, including, but not limited to, a CD-ROM, DVD-ROM, flash drive, floppy disk, or like device, accessed through virtual data store(s), or like mechanism., etc.) having an instanced object variable 512 as described herein (e.g., d.y described at FIG. 4, supra). If computing environment accesses or otherwise executes data object 504, a value (e.g., programmatic code, number, variable, data, string of data, or the like) and/or addressing mechanism can be provided that identifies memory 506 and/or a portion thereof. Additionally, such memory or portion thereof can be allocated to storing data and/or code related to instance object 512.

Retrieval component 508 can utilize an addressing mechanism provided by data object 504 to locate memory 506 and portions thereof related to instanced object 512, obtain any value stored therein, and provide that value to computing environment 510. It should be appreciated that retrieval component 508 can be a simple mechanism such as a system bus, data line, or the like between computing environment 510 and memory 506, or alternatively can include processing hardware, one or more threads of execution, or an operating environment configured to interface between memory 506 and a computing environment 510.

Figure 6:
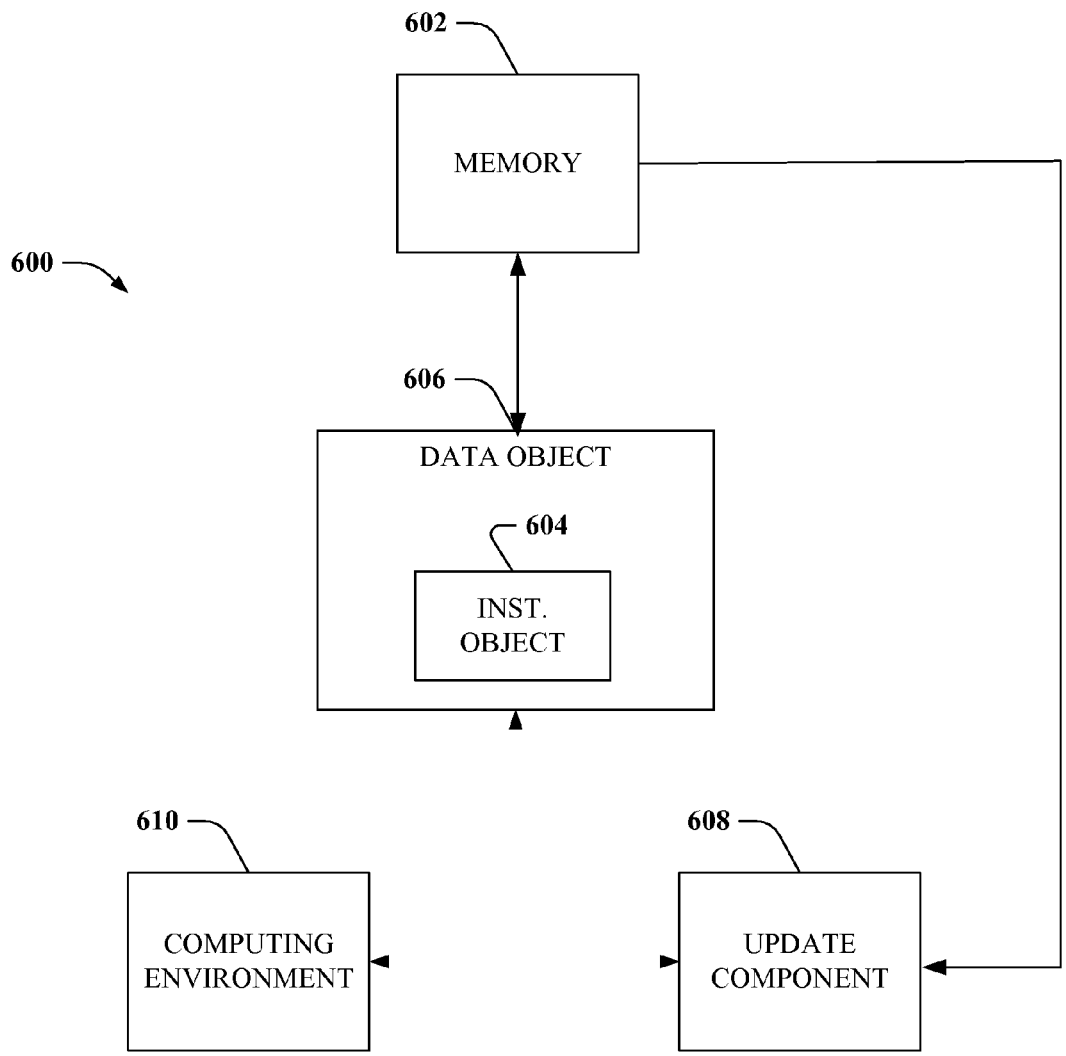
FIG. 6 illustrates a sample system that updates a value of a free variable captured by an expression tree.

FIG. 6 illustrates a sample system 600 that can update a value stored in memory 602 allocated to a free variable captured by an expression tree (606). Conventional thought on explicit expressive constructs such as expression trees suggested that code contained within such constructs (e.g., free variables) required additional explicit representation in order to convey access to such code rather than merely call the code as a function, for instance. Access can include an ability to read and/or write (e.g., view, change, erase, etc.) to memory allocated to the construct. More specifically, explicit access to a free variable captured by an expression tree and conveyed along with the expression tree would not be available without an additional explicit representation of the free variable itself. For example, prior techniques could accomplish such additional explicit representation by wrapping free variables (or, e.g., other code constructs such as a data object 606 or instanced object 604) in a funclet. The funclet can provide a reference to memory allocated to the free variable. In certain instances, the funclet could be executed and retrieve a value of a free variable when the free variable was accessed, executed, or the like.

In contrast to prior techniques, the subject innovation provides for read/write access to a free variable captured within an expression tree, or other explicit expressive representation, without additional explicit representation of the variable itself. Consequently, free variables passed to an operating environment (604) can be read and written to, as full data objects, by virtue of being included within an expression tree or other data object. As depicted at FIG. 6, a data object 606 containing an instanced object 604 (e.g., the instanced variable d.y described at FIG. 4, supra) can be provided to a computing environment. More specifically, the data object 606 can be transmitted over a data line, data network, wireless network or the like, loaded onto computing environment 610 via removable hardware such as a CD-ROM, DVD-ROM, flash drive, floppy disk, or like device, accessed through virtual data store(s), or like mechanism.

If computing environment 610 executes data object 606 and/or instanced object 604, a value associated with instanced object 604 can be changed and updated, for instance by programmatic code directed toward such a result. An example of such programmatic code can include the following:

```
class C {
    class Display {
        int y;
    }
    Display d = new Display ( );
    void F( ) {
        d.y = 1;
        Expression<Function<int,int>> g = x => x + d.y;
        int z = d.y + 2;
        d.y = 5;
    }
}
```

Instanced object d.y (604) is referenced within an expression tree (606) that assigns a lambda expression to data object 'g'. Variable 'z' is an integer assigned to a value of d.y+2. This statement retrieves a value of d.y (e.g., retrieval component 508), adds 2 to the value, and assigns the result to 'z'. The final statement assigns a value of 5 to instance object d.y (604). Such assignment can be carried out by update component 608.

Update component 608 can interface with memory 602 to update a value allocated to instanced object 604 to reflect the change. Update component can include a simple mechanism such as a system bus, data line, or the like between computing environment 610 and memory 602, or alternatively can include processing hardware, one or more threads of execution, or an operating environment configured to interface between memory 602 and a computing environment (610). As described, system 600 can facilitate write access to a captured local variable, represented as an instance (604) of a data object 606, such as an expression tree.

As noted, systems 500 and 600 are merely two specific examples of systems that utilize and provide access to mobile data objects such as instanced free variables presented within an expression tree as described herein. Additional systems will be appreciated by those of skill in the art upon reading of this specification. By way of example and not limitation, where a system includes a processor and a co-processor such as graphics co-processor, aspects of the disclosed subject matter can be employed. For instance, an expression tree can represent some rendering of a polygon that has free variables captured by reference. In such a scenario, the co-processor could call back to the main processor to obtain or modify a value of a free variable and/or sub-expression. Consequently, parallel processing is supported.

Figure 7:
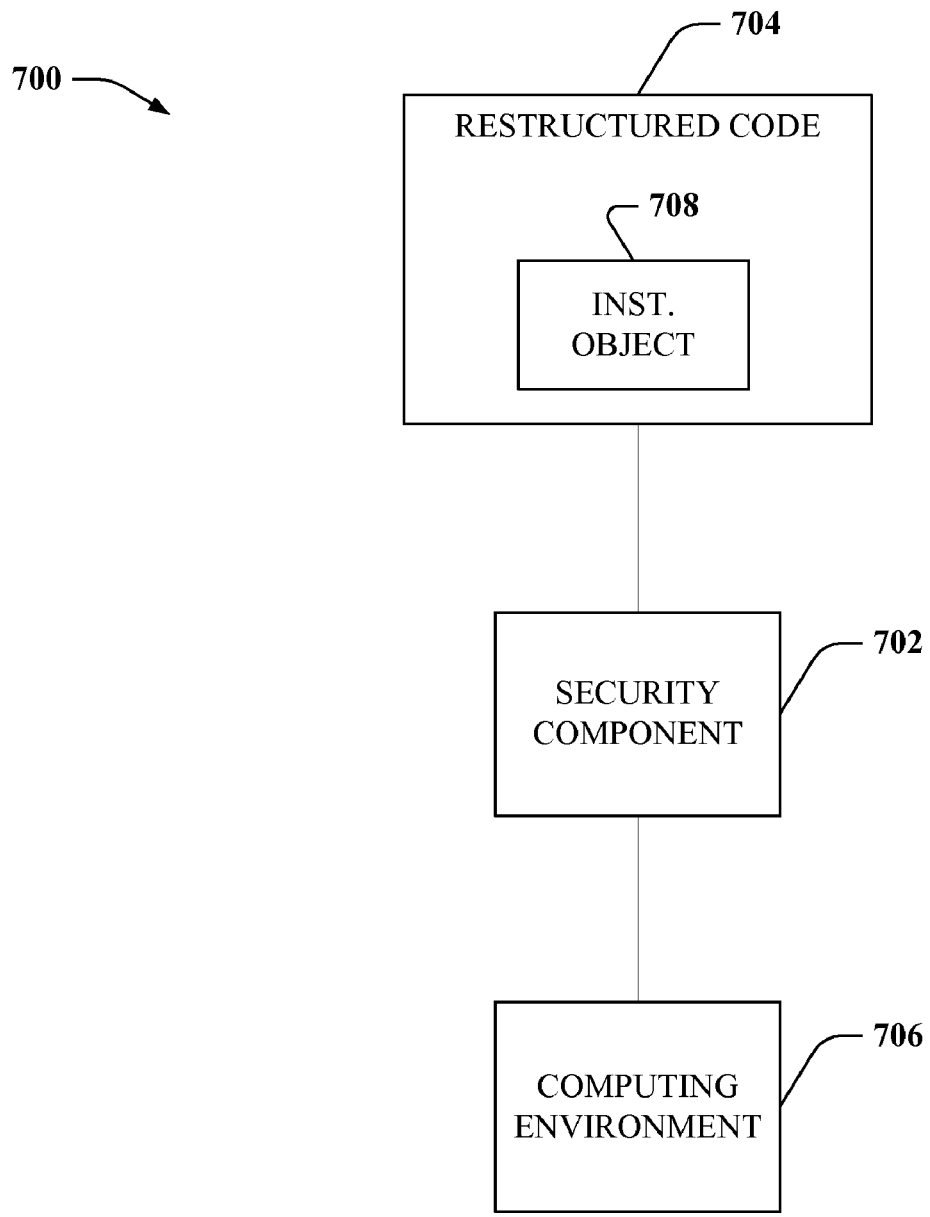
FIG. 7 depicts an example system for securing an environment object at run time.

FIG. 7 depicts an example system 700 that can secure an environment object at run time. A field of an object class can typically be read and/or written to upon gaining access to an instance of the object (e.g., an expression tree). For example, if an outer variable is defined as a field of a private class and captured within an expression tree, having access to the expression tree provides a reference to the field. Consequently, the field is no longer private to the class; it can be exported out of the class, changed, modified, erased, etc. Consequently, data stored in the field might not be as secure as if it were private to the class. System 700 provides an environment wherein a security component 702 can perform a security check during run time as a condition to accessing a field exported from a private class, as described in the claimed subject matter.

Restructured code 704 can include a free variable rewritten as a field of a class, wherein an instance of the field, defined local to a method, is captured by a closure with the method, as described herein (e.g., see the programmatic code described at FIG. 6, supra). Furthermore, such closure can be expressed as an explicit representation, such as a data object or an expression tree. The explicit representation of restructured code 704 can provide access to the free variable through the data object or expression tree. More specifically, passing the data object or expression tree can also pass a direct reference to the code stored within memory allocated to the free variable.

To ensure reliability of object code and/or data, security component 702 can require a security measure be met by a computing environment 706 at run time in order for valid access to the free variable or similar construct. For example, a security measure could include a username and password, digital certificate, login information, or the like related to computing environment, and/or a user thereof, stored within memory (not depicted) that can be accessed by security environment upon execution of restructured code 704. If computing environment 706 does not sufficiently comply with the security measure, security component 702 can halt execution of restructured code 704 (e.g., by providing a run time error or the like). In such a manner, reliability of code exposed through an instanced field object can be maintained.

Figure 8:
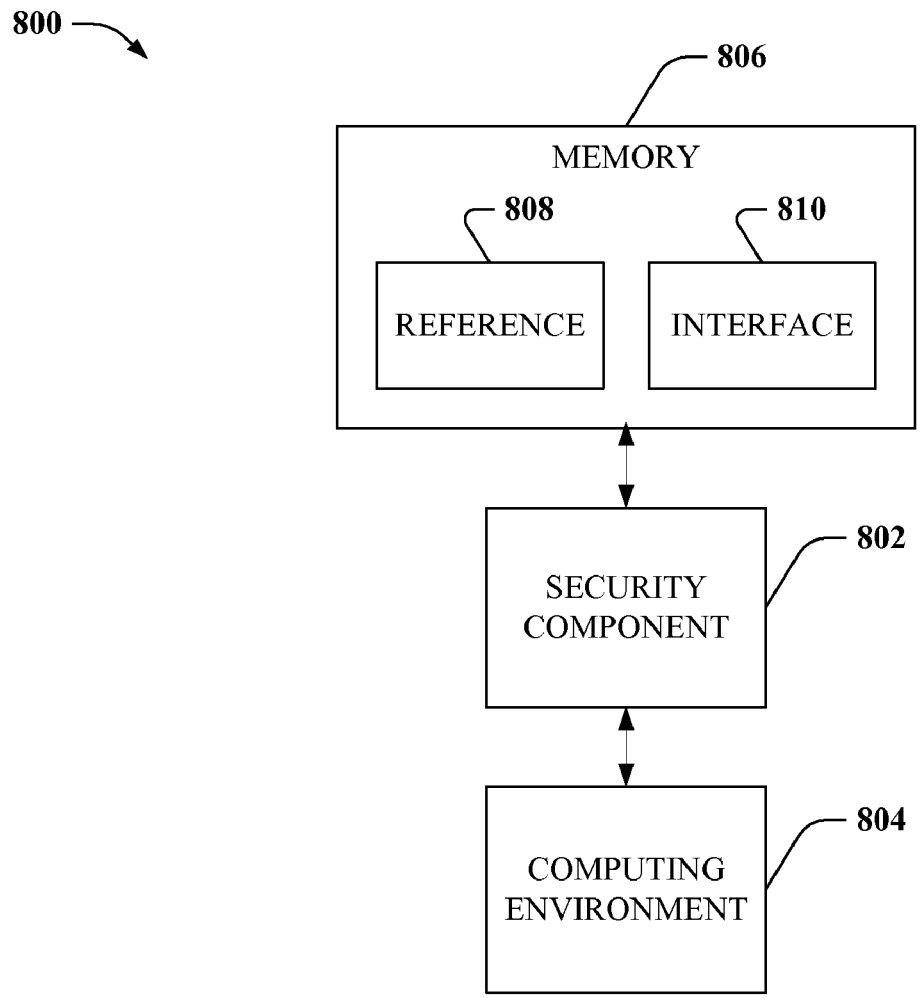
FIG. 8 illustrates an example system for reading and writing to an environment object utilizing run time security in accord with aspects disclosed herein.

FIG. 8 illustrates an example system 800 that can read and write to an environment object utilizing run time security (802) in accord with aspects disclosed herein. Computing environment 804 can be provided programmatic code containing a reference to an environment object, or instance thereof, within an expression tree (e.g., via a data line, network, network removable hardware, accessed through virtual data store(s), and/or the like). In addition, security component 802 can condition access to memory 806 (e.g., hard disk, CD, DVD, floppy, flash disc, virtual disk or system, etc.) having a reference 808 to the environment object based on satisfying a security measure upon execution of the programmatic code and/or the environment object. If such security measure is not complied with, security component 802 can halt execution of the programmatic code or portion thereof, and list a run time error, for example. If computing environment does comply with the security measure, access to the memory reference 808 associated with the environment object can be granted by way of interface 810.

In accord with aspects of the claimed subject matter, system 800 can facilitate reading and writing to a memory reference 808 associated with an environment object. Interface 810 can be a system bus, data line, operating environment, thread of execution, processor, process, or combinations thereof or of the like, that can facilitate conditional reading and writing to memory 806. Such condition can be provided by security component 802, for instance. More specifically, if computing environment 804 complies with a security measure established by security component 802, interface 810 can process commands (or, e.g., allow commands such as reading, erasing, writing, etc. executed by computing environment 804 to be conducted there with) provided by an external entity relating to memory 806. For example, interface 810 can retrieve a value of an environment object stored at memory reference 808, erase such value, write and change such value, etc.

In addition, system 800 can record access and/or attempted access to memory 806 facilitated through security component 802, including a memory reference (808) affected, an identity of an operating environment 804 requesting such access, any compliance or lack of compliance with a security measure established by security component 802, actual change or access facilitated via interface 810 to memory 806, or like occurrence. In such a manner, system 800 can facilitate secure interaction with environment objects and/or instances thereof described herein, and retain troubleshooting information to identify attempted unauthorized access.

The aforementioned systems have been described with respect to interaction between several components. It should be appreciated that such systems and components can include those components or sub-components specified therein, some of the specified components or sub-components, and/or additional components. For example, a system could include code restructuring component 106, identification component 304, and security component 702 or a combination of these and other components. Sub-components could also be implemented as components communicatively coupled to other components rather than included within parent components. Additionally, it should be noted that one or more components may be combined into a single component providing aggregate functionality. For instance, retrieval component 508 can include update component 608, or vice versa, to facilitate read/write operations via a single component. The components may also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 9-12. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Figure 9:
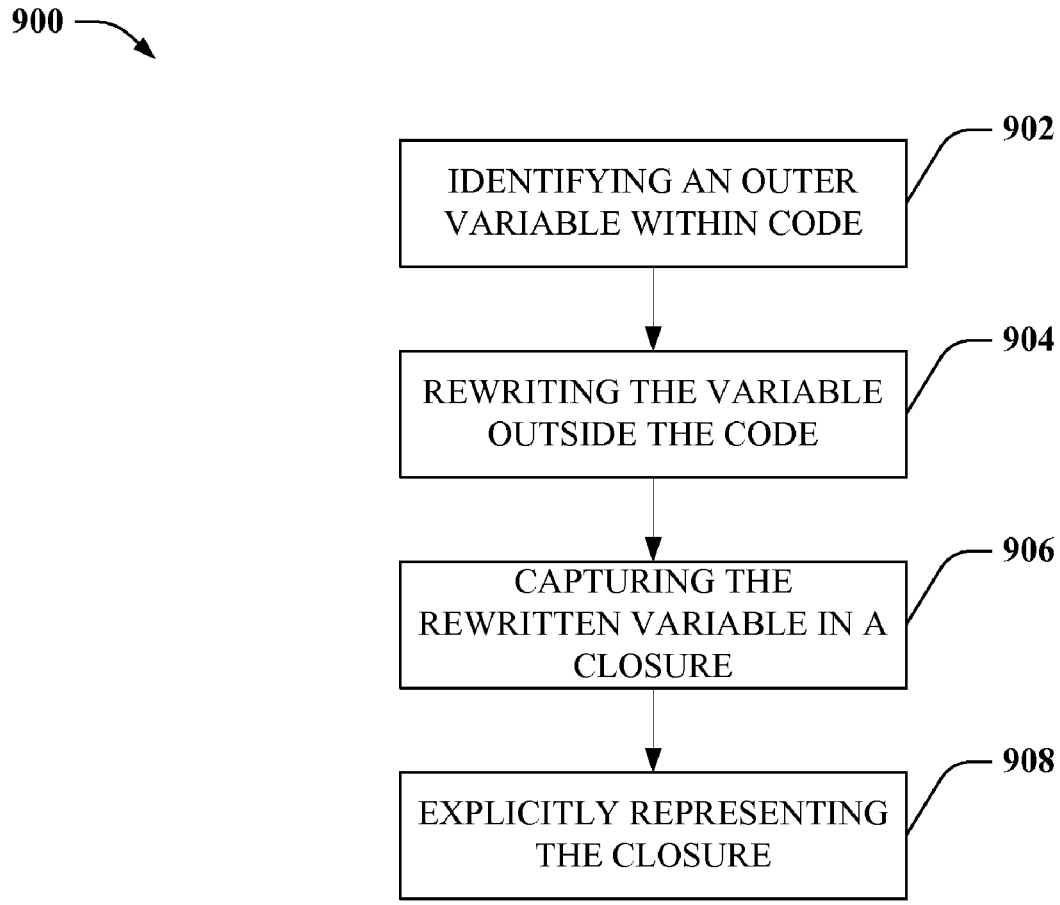
FIG. 9 illustrates a sample methodology for capturing a free variable in accord with aspects of the subject innovation.

Referring now to FIG. 9, an example flow chart diagram of a methodology 900 is depicted for capturing a free variable in accord with aspects of the subject innovation. At 902, one or more outer variables can be identified with code. A free or outer variable can refer to a variable captured (e.g., referenced, called, etc.) in programmatic code, but not defined by that code. As such, an outer variable can survive termination of a particular class, method, function, expression, or the like, that captures the variable. Although such classes, methods, etc., cannot terminate the outer variable, they can still bind and extend the life of such variable to at least the life of the class, method, etc.

At 904, the free variable can be rewritten outside the capturing code. For instance, a free variable captured by a lambda expression can be rewritten as a field of a private class outside of the lambda expression and of a programmatic level equal to or different from the lambda expression. At 904, an instance of the rewritten variable can be captured in a closure, such as a lambda expression or other method, function, class or the like. At 908, the closure can be rewritten as an explicit expressive representation (e.g., an intentional representation that turns code into an object or a different type of object). In such a manner, methodology 900 can extend the lifetime of a free variable by rewriting it outside captured code, and provide access to an expressive form of the variable by capturing an instance of the rewritten variable in an expressive representation of a closure.

Figure 10:
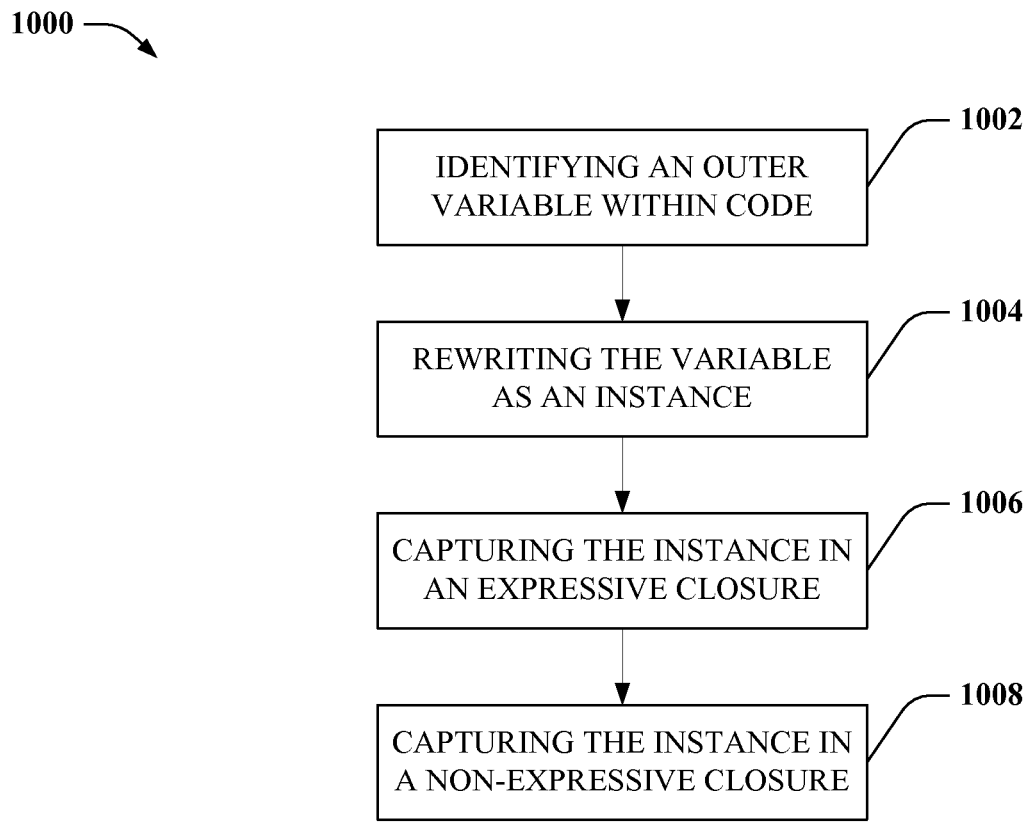
FIG. 10 depicts an exemplary methodology for capturing and rewriting a free variable in accord with the claimed subject matter.

FIG. 10 illustrates an exemplary flow chart methodology 1000 for capturing and rewriting a free variable in accord with the claimed subject matter. At 1002, an outer variable is identified within code. Such identification can be, for instance, by determining a variable that is referenced within a closure but not defined within an argument list of the closure. At 1004, the variable is rewritten as an instance of the outer variable. For example, the outer variable can be rewritten as a field of a private class, and an instance of the class referencing the outer variable/field can be generated. To illustrate, the following code can be received having an outer variable 'y':

```
class C {
    void F( ) {
        int y = 1;
        Function<int,int> f = x => x - y;
        Expression<Function<int,int>> g = x => x + y;
    }
}
```

The following rewritten code can be illustrative of acts that can be performed at reference number 1004:

```
class C {
    class Display {
        int y;
    }
    Display d = new Display( );
    void F( ) {
        d.y = 1;
    }
}
```

As shown, outer variable 'y' can be rewritten as a field of type integer of class Display, where class Display can be a private class. An instance of field 'y' is defined at d.y, where all access to the local outer variable 'y' changes into access of the instance variable d.y. In such a manner, local variable d can be made, in effect, read only. Consequently, such local variable 'd' can be captured in a closure (e.g., an explicit expressive closure or a non-explicit expressive closure, or both) by simply capturing an object that references 'd' (e.g., an expressive representation of d.y), or a reference to such object, instead of the variable 'd' itself. Because variable 'd' is effectively read only, such object and/or reference thereto will not change over time. In addition, because field 'y' is a field of an environment object, its lifetime is not bound to a method (e.g., method F ( )).

At 1006, methodology 1000 can capture the instance in an explicit expressive closure, such as a data object, or expression tree or the like. The following code can be illustrative of acts performed at reference number 1006:

$$Expression<Function<int,int>>g=x=>x+d.y$$

The lambda expression x=>x+d.y contains the instance variable d.y of field 'y'. Such lambda expression is further assigned to an expression tree 'g'. In such a manner, d.y can be passed along with the expression tree as a read/write data object.

At 1008, methodology 1000 can capture the instance in a non-explicit expressive closure, such as a function, lambda expression, or the like. The following code can be illustrative of acts performed at reference number 1008:

Function<int,int>f=x=>x-d.y

The lambda expression x=>x-d.y contains the same instance of the variable d.y of field 'y' as captured in the expression tree, above. Here, however, the lambda expression is assigned to a delegate, anonymous method, or the like, 'f', by the assignment statement Function<int,int> f. Consequently, the same Display object can be shared by an explicit construct and a non-explicit construct. The full rewritten code can appear as follows:

```
class C {
    class Display {
        int y;
    }
    Display d = new Display( );
    void F( ) {
        d.y = 1;
        Function<int,int> f = x => x - d.y;
        Expression<Function<int,int>> g = x => x + d.y
    }
}
```

As a result, methodology 900 can rewrite code containing a captured outer variable (e.g., captured within a lambda function defined as part of a method, F ( )) such that access to the captured outer variable (e.g., 'y') can be made via an instance of an object 'd'. Consequently, the field 'y' of the object 'd' can be accessible from an expression tree, which is analogous to modifying the local outer variable 'y' within the original method F ( ). Therefore, methodology 900 can fully capture an outer variable and present it as an explicit and fully expressive read/write object.

Figure 11:
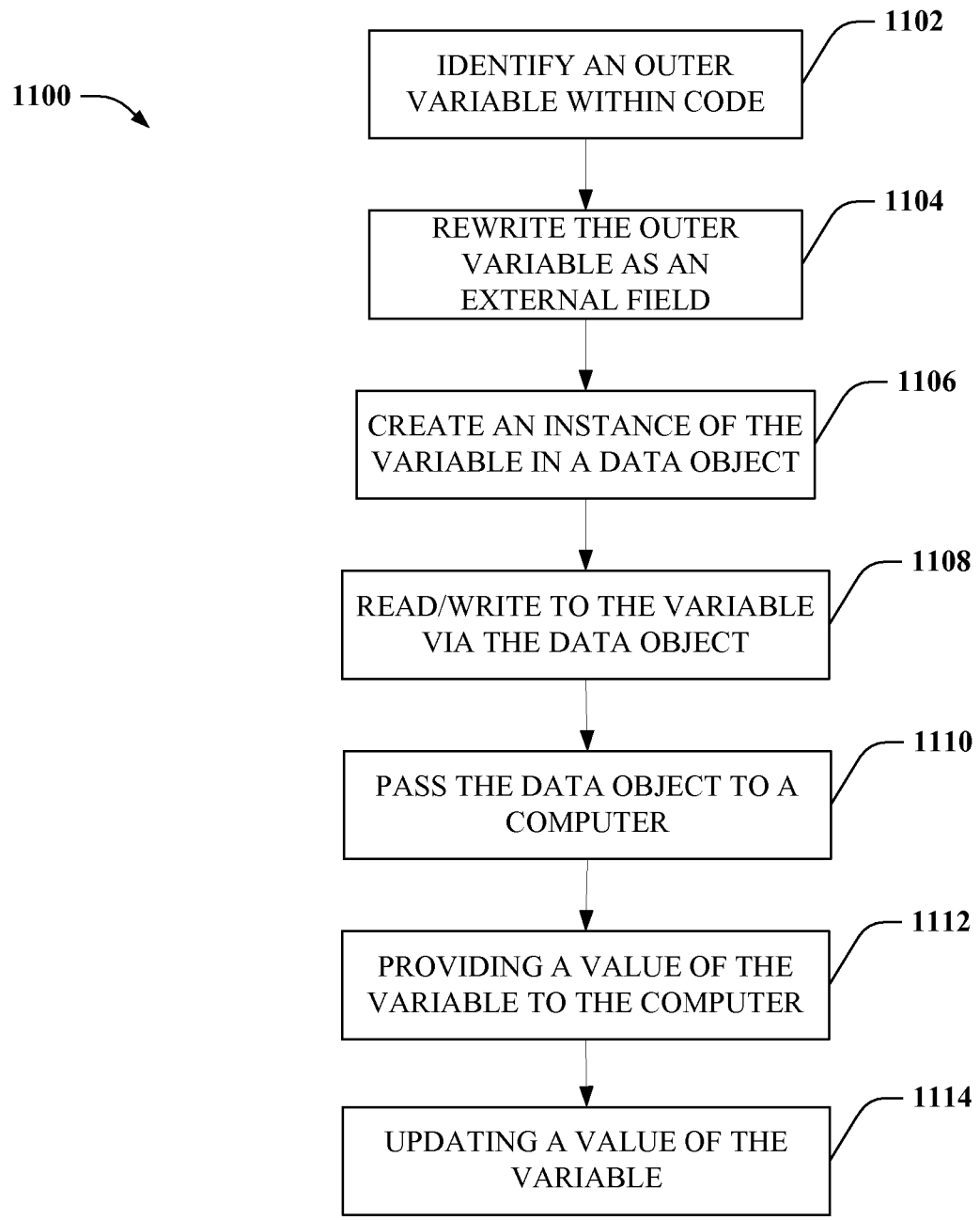
FIG. 11 depicts an exemplary methodology for instantiating an environment object and a free variable.

FIG. 11 depicts an exemplary flow chart diagram of a methodology 1100 for instantiating an environment object and a free variable. At 1102, an outer variable is identified within code. At 1104, the outer variable can be rewritten as a field of an object variable external to the code. At 1106, an instance of the variable can be created as a data object (e.g., explicit expression representation of code). At 1108, read/write access to the variable can be provided via the data object. At 1110 the data object is passed to a first computing device. At 1112 the value of the outer variable is provided to the first computing device. At 1114, a value of the outer variable is updated as a result of a process affecting the data object at the first computing device.

Figure 12:
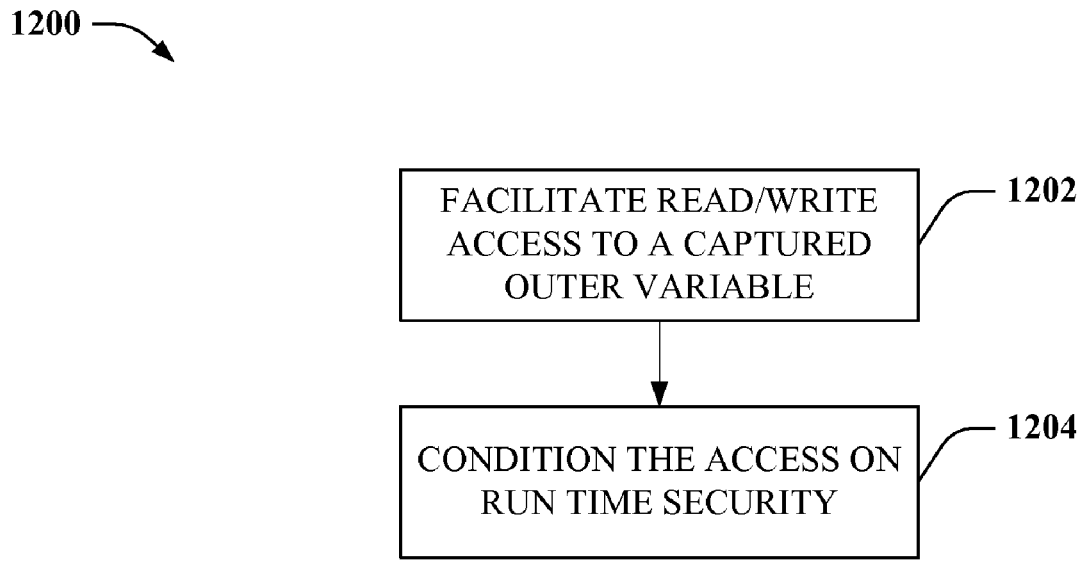
FIG. 12 illustrates an example methodology for securing an environment object in accord with the subject disclosure.

FIG. 12 illustrates an example flow chart diagram of a methodology 1200 for securing an environment object in accord with the subject disclosure. At 1202, read/write access is facilitated to a captured outer variable. For example, the methodology 1100 or like methodology can be utilized to facilitate such access. At 1204, the read/write access is conditioned on run time security. Run time security can include, for example, verification of a user ID, password, digital certificate, login, operating identity, or like identifier and/or classifier, at execution of the captured outer variable and/or programmatic code containing such variable. In such a manner, methodology 1200 can enable a more secure and faithful representation of code represented as data, to a reliable state of such code.

Figure 13:
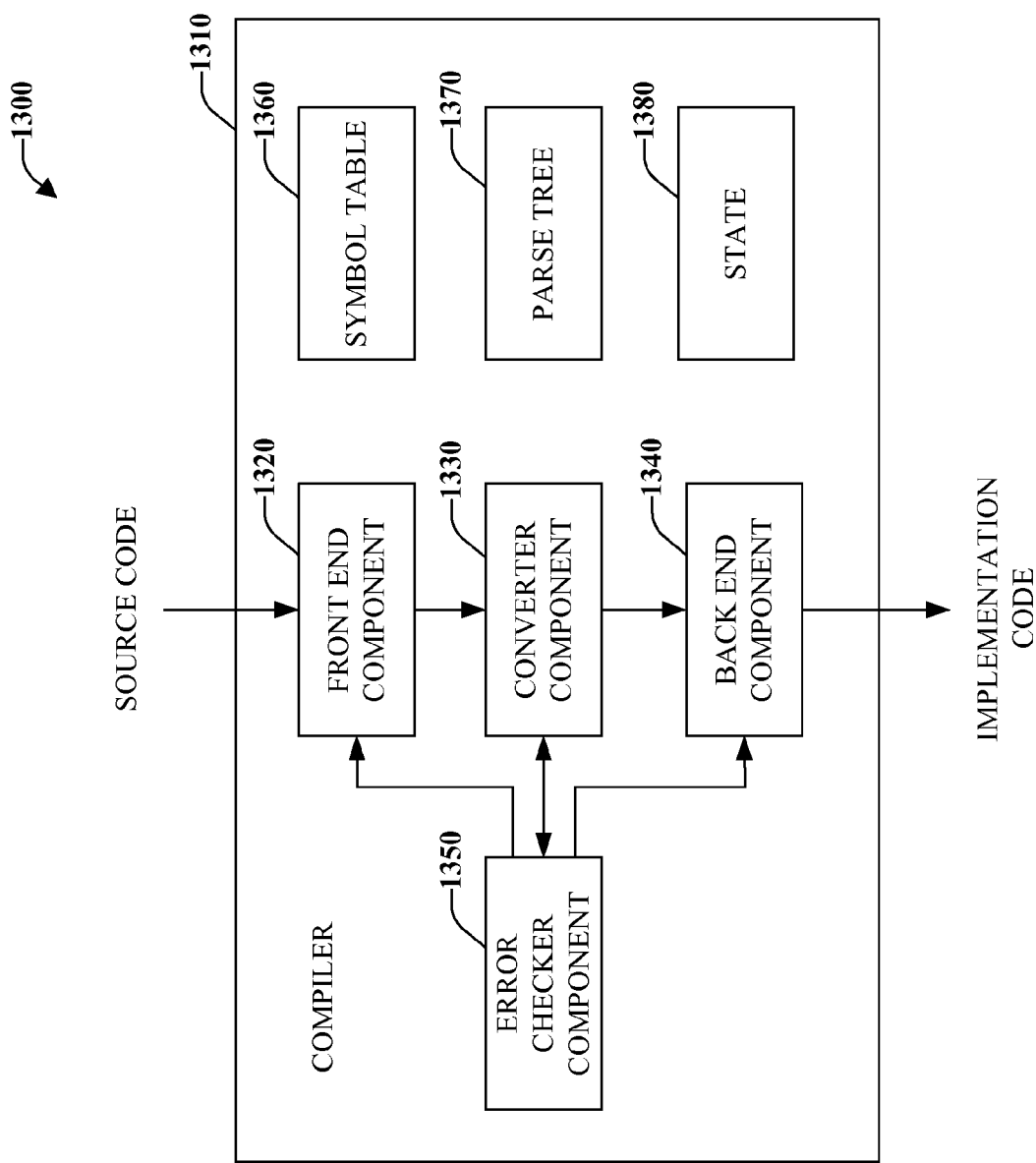
FIG. 13 depicts an example compiler that can rewrite source code in accord with aspects of the subject innovation.

FIG. 13 depicts an example compiler environment 1300 that can receive, process, and rewrite and/or restructure source code in accord with aspects of the subject innovation. In particular, compiler environment 1300 can produce implementation code (e.g., executable, intermediate language . . . ). The compiler environment 1300 includes a compiler 1310 including front-end component 1320, converter component 1330, back-end component 1340, error checker component 1350, symbol table 1360, parse tree 1370, and state 1380. The compiler 1310 accepts source code as input and produces implementation code as output. The input can include but is not limited to delimited programmatic expressions or qualified identifiers as described herein. The relationships amongst the components and modules of the compiler environment illustrate the main flow of data. Other components and relationships are not illustrated for the sake of clarity and simplicity. Depending on implementation, components can be added, omitted, split into multiple modules, combined with other modules, and/or other configurations of modules.

Compiler 1310 can accept as input a file having source code associated with processing of a sequence of elements. The source code may include lambda expressions and associated functions and/or methods and/or mobile code or expression trees. Compiler 1310 may process source code in conjunction with one or more components for analyzing constructs and generating or injecting code.

A front-end component 1320 reads and performs lexical analysis upon the source code. In essence, the front-end component 1320 reads and translates a sequence of characters (e.g., alphanumeric) in the source code into syntactic elements or tokens, indicating constants, identifiers, operator symbols, keywords, and punctuation among other things.

Converter component 1330 parses the tokens into an intermediate representation. For instance, the converter component 1330 can check syntax and group tokens into expressions or other syntactic structures, which in turn can coalesce into statement trees. Conceptually, these trees form a parse tree 1370. Furthermore and as appropriate, the converter module 1330 can place entries into a symbol table 1360 that lists symbol names and type information used in the source code along with related characteristics.

A state 1380 can be employed to track the progress of the compiler 1310 in processing the received or retrieved source code and forming the parse tree 1370. For example, different state values can indicate that the compiler 1310 is at the start of a class definition or functions, has just declared a class member, or has completed an expression. As the compiler progresses, it continually updates the state 1380. The compiler 1310 may partially or fully expose the state 1380 to an outside entity, which can then provide input to the compiler 1310.

Based upon constructs or other signals in the source code (or if the opportunity is otherwise recognized), the converter component 1330 or another component can inject code to facilitate efficient and proper execution. Rules coded into the converter component 1330 or other component indicates what must be done to implement the desired functionality and identify locations where the code is to be injected or where other operations are to be carried out. Injected code typically includes added statements, metadata, or other elements at one or more locations, but this term can also include changing, deleting, or otherwise modifying existing source code. Injected code can be stored as one or more templates or in some other form. In addition, it should be appreciated that symbol table manipulations and parse tree transformations can take place.

Based on the symbol table 1360 and the parse tree 1370, a back-end component 1340 can translate the intermediate representation into output code. The back-end component 1340 converts the intermediate representation into instructions executable in or by a target processor, into memory allocations for variables, and so forth. The output code can be executable by a real processor, but the invention also contemplates output code that is executable by a virtual processor.

Furthermore, the front-end component 1320 and the back end component 1340 can perform additional functions, such as code optimization, and can perform the described operations as a single phase or in multiple phases. Various other aspects of the components of compiler 1310 are conventional in nature and can be substituted with components performing equivalent functions. Additionally, at various stages of processing of the source code, an error checker component 1350 can check for errors such as errors in lexical structure, syntax errors, and even semantic errors. Upon detection error, checker component can halt compilation and generate a message indicative of the error.

Figure 14:
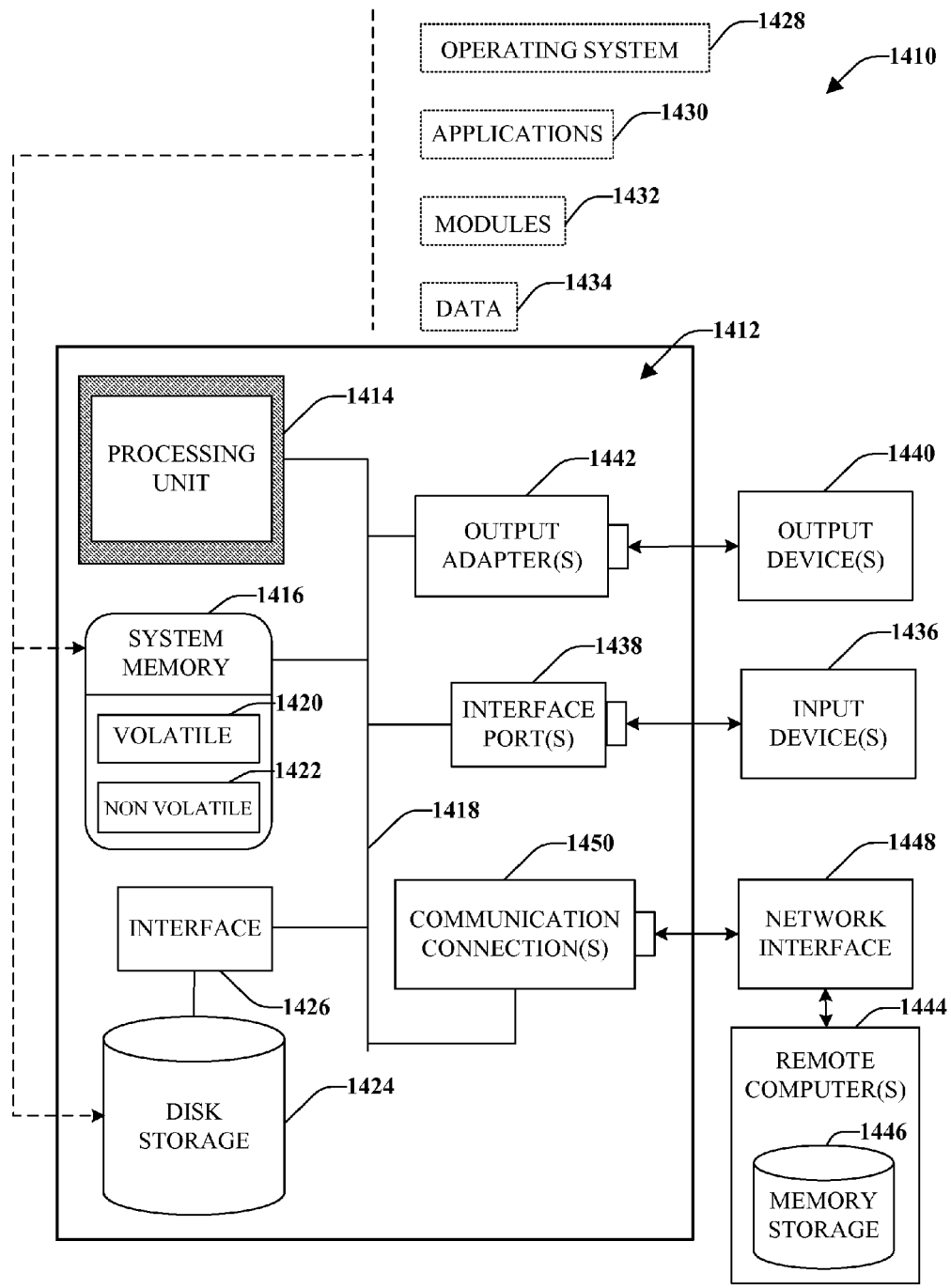
FIG. 14 illustrates an example operating environment for processing programming instructions in accord with aspects of the claimed subject matter.
Figure 15:
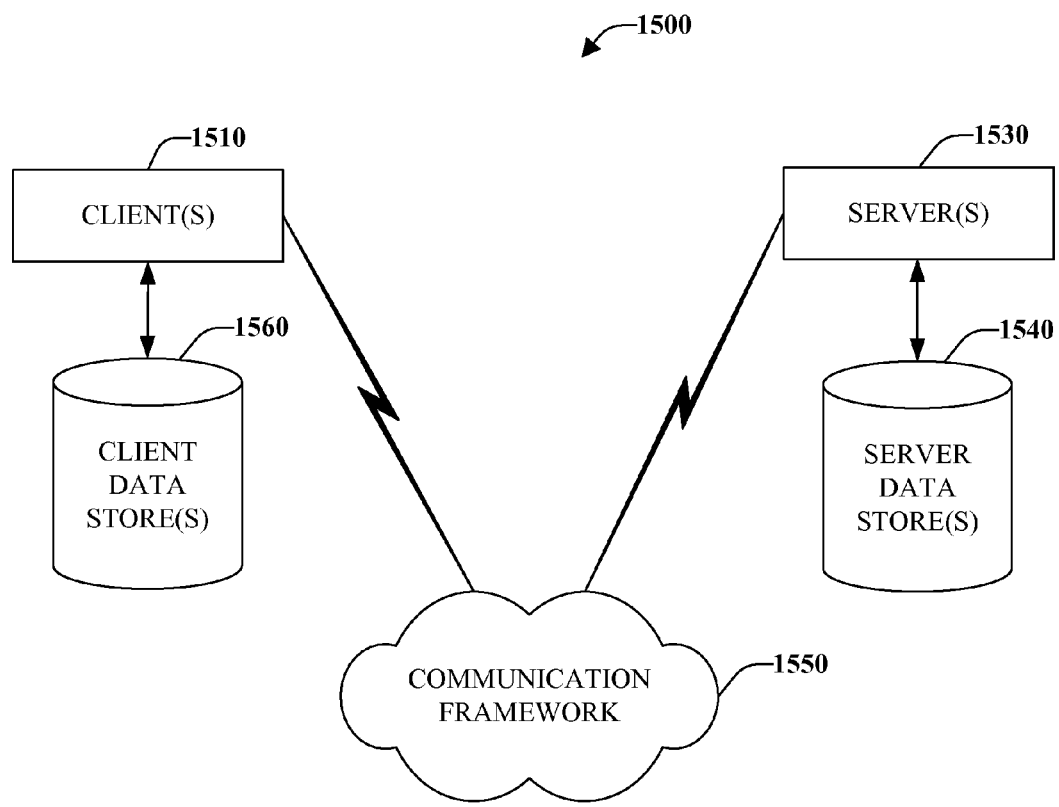
FIG. 15 depicts an example networking environment for facilitating remote interaction among computing environments.

In order to provide additional context for the various aspects of the disclosed subject matter, FIGS. 14 and 15 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules.

Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on standalone computers. In a distributed computing environment, program modules may be located in both local and remote memory storage devices.

With reference to FIG. 14, an exemplary environment 1410 for implementing various aspects disclosed herein includes a computer 1412 (e.g., desktop, laptop, server, hand held, programmable consumer or industrial electronics . . . ). The computer 1412 includes a processing unit 1414, a system memory 1416, and a system bus 1418. The system bus 1418 couples system components including, but not limited to, the system memory 1416 to the processing unit 1414. The processing unit 1414 can be any of various available microprocessors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/non-volatile computer storage media. FIG. 14 illustrates, for example, disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the present invention can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412 and to output information from computer 1412 to an output device 1440. Output adapter 1442 is provided to illustrate that there are some output devices 1440 like displays (e.g., flat panel and CRT), speakers, and printers, among other output devices 1440 that require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems, power modems and DSL modems, ISDN adapters, and Ethernet cards or components.

FIG. 15 is a schematic block diagram of a sample-computing environment 1500 with which the present invention can interact. The system 1500 includes one or more client(s) 1510. The client(s) 1510 can be hardware and/or software (e.g., threads, processes, computing devices). The system 1500 also includes one or more server(s) 1530. Thus, system 1500 can correspond to a two-tier client server model or a multi-tier model (e.g., client, middle tier server, data server), amongst other models. The server(s) 1530 can also be hardware and/or software (e.g., threads, processes, computing devices). The servers 1530 can house threads to perform transformations by employing the present invention, for example. One possible communication between a client 1510 and a server 1530 may be in the form of a data packet adapted to be transmitted between two or more computer processes.

The system 1500 includes a communication framework 1550 that can be employed to facilitate communications between the client(s) 1510 and the server(s) 1530. The client(s) 1510 are operatively connected to one or more client data store(s) 1560 that can be employed to store information local to the client(s) 1510. Similarly, the server(s) 1530 are operatively connected to one or more server data store(s) 1540 that can be employed to store information local to the servers 1530.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. In a computing environment that includes one or more processors and memory, a method for capturing an outer variable and rewriting the outer variable as a field of an object, the method comprising:

identifying an outer variable within a portion of source code, the outer variable comprising a variable that is bound by a programmatic expression within the portion of source code, but that is defined outside of the programmatic construct within the portion of source code; and capturing the outer variable by rewriting the portion of source code, including rewriting the portion of source code to:

define the outer variable as a field of an object that is declared externally to the programmatic expression;

instantiate an instance of the object externally to the programmatic expression; and bind to the field of the instance of the object within the programmatic expression instead of binding to the outer variable directly within the programmatic expression.

2. The method of claim 1, the object comprising a class, the outer variable defined as a field of the class.

3. The method of claim 1, binding to the field of the instance of the object within the programmatic expression comprising substituting the outer variable with a reference to the field of the instance of the object within an expression tree.

4. The method of claim 1, the programmatic expression is a lambda expression.

5. The method of claim 1, comprising providing read/write access to the instance of the object that is conditioned on run time security.

6. The method of claim 5, the run time security includes verification of a user ID, a password, a digital certificate, a login identity, or an operating identity, or a combination thereof.

7. The method of claim 1, comprising passing the instance of the object to a first computing device via an ad hoc network, a wired network or a wireless network, the Internet, an intranet, or a combination thereof.

8. The method of claim 7, comprising providing a value of the captured outer variable to the first computing device.

9. The method of claim 7, comprising writing to and updating the captured outer variable via the instance of the object as a result of a process affecting the captured outer variable at the first computing device.

10. The method of claim 1, rewriting the portion of source code comprising converting the outer variable from a stack-based variable to a heap-based object.

11. The method of claim 1, rewriting the portion of source code comprising converting the outer variable from a primitive type to the field within the object.

12. The method of claim 1, the object defined at a hierarchical scope higher than the outer variable.

13. The method of claim 1, the object defined by the rewriting having a life longer than the outer variable prior to the rewriting.

14. One or more computer storage device having stored thereon computer executable instructions that, when executed by one or more processors of a computer system, implement a method for capturing an outer variable and rewriting the outer variable as a field of an object, the method comprising:
- identifying an outer variable within a portion of source code, the outer variable comprising a variable that is bound by a programmatic expression within the portion of source code, but that is defined outside of the programmatic construct within the portion of source code; and
- capturing the outer variable by rewriting the portion of source code, including rewriting the portion of source code to:
  - declare the outer variable as a field of an object that is declared externally to the programmatic expression;
  - instantiate an instance of the object externally to the programmatic expression; and
  - use the field of the instance of the object within the programmatic expression instead of binding to the outer variable directly within the programmatic expression.

15. A computer system that fully captures outer variables as data objects, the computer system comprising:
- one or more processors; and
- one or more computer storage device having stored thereon computer-executable instructions that, when executed by the one or more processors, implement a method, comprising:
  - identifying an outer variable within a portion of source code, the outer variable comprising a variable that is bound by a programmatic expression within the portion of source code, but that is defined outside of the programmatic construct within the portion of source code; and
  - capturing the outer variable by rewriting the portion of source code, including rewriting the portion of source code to:
    - define the outer variable as a field of an object that is declared externally to the programmatic expression;
    - create an instance of the object externally to the programmatic expression; and
    - substitute the outer variable within the programmatic expression with a reference to the field of the instance of the object.

* * * * *